(12) United States Patent
Tanaka et al.

(10) Patent No.: US 6,791,648 B2
(45) Date of Patent: Sep. 14, 2004

(54) LIQUID CRYSTAL DEVICE, PROJECTION DISPLAY DEVICE AND, MANUFACTURING METHOD FOR SUBSTRATE FOR LIQUID CRYSTAL DEVICE

(75) Inventors: Takaaki Tanaka, Matsumoto (JP); Yasushi Yamazaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 104 days.

(21) Appl. No.: 10/076,312

(22) Filed: Feb. 19, 2002

(65) Prior Publication Data

US 2003/0011740 A1 Jan. 16, 2003

(30) Foreign Application Priority Data

Mar. 15, 2001 (JP) .................................. 2001-074355
Mar. 27, 2001 (JP) .................................. 2001-090529

(51) Int. Cl.$^7$ .......................... G02F 1/1337; G02F 1/13
(52) U.S. Cl. ...................................... 349/129; 349/172
(58) Field of Search ................................ 349/130, 129, 349/125, 179

(56) References Cited

U.S. PATENT DOCUMENTS 4,146,656 A * 3/1979 Kinugawa et al. .......... 427/109
5,189,535 A * 2/1993 Mochizuki et al. ........... 349/33
5,446,569 A * 8/1995 Iwai et al. .................. 349/124

FOREIGN PATENT DOCUMENTS

| GB | 1 583 176 | 1/1981 |
|---|---|---|
| JP | 53-54041 | 5/1978 |
| JP | 53-60254 | 5/1978 |

* cited by examiner

*Primary Examiner*—Toan Ton
(74) *Attorney, Agent, or Firm*—Oliff & Berridge, PLC

(57) ABSTRACT

A liquid crystal device has inorganic alignment layers (36, 42) disposed on a surface of a liquid crystal layer side of a pair of the substrates, when the range of the average pre-tilt angle θ of liquid crystal molecules 50a of the liquid crystal layer is 5 degrees ≦ θ ≦ 20 degrees, twist angle φ of the liquid crystal molecules (50a) of the liquid crystal layer, cell gap d, and helical pitch P of the liquid crystal molecules of the liquid crystal layer satisfy the relationship of $(0.6/360)\phi < d/P < (1.4/360)\phi$, and when the range of the average pre-tilt angle θ of liquid crystal molecules 50a of the liquid crystal layer is θ>20 degrees, twist angle φ of the liquid crystal molecules (50a) of the liquid crystal layer, cell gap d, and helical pitch P of the liquid crystal molecules of the liquid crystal layer satisfy the relationship of $(0.8/360)\phi < d/P < (1.6/360)\phi$.

13 Claims, 15 Drawing Sheets

LIQUID CRYSTAL DEVICE, PROJECTION DISPLAY DEVICE AND, MANUFACTURING METHOD FOR SUBSTRATE FOR LIQUID CRYSTAL DEVICE

BACKGROUND OF THE INVENTION

1. Field of the Invention

The present invention relates to liquid crystal devices, projection display devices, and manufacturing methods for substrates for liquid crystal devices. This invention particularly relates to the construction of desirable liquid crystal devices to be used as a light source for a liquid crystal projector, and to a manufacturing method for a substrate for a liquid crystal device.

2. Description of Related Art

For a projection liquid crystal display device, such as a liquid crystal projector, there is the three-panel type in which three liquid crystal panels corresponding to the three primary colors red (R), green (G), and blue (B) are used, and the one-panel type in which one liquid crystal panel and a color generating device are used. For a liquid crystal light source which is a part of such a projection liquid crystal display device, active matrix type liquid crystal panels are typically used.

Also, a liquid crystal panel comprises, for example an active matrix type liquid crystal light source and polarizing plates which are disposed in the front and in the rear of the active matrix type liquid crystal light source. FIG. 18 is a cross section showing an example of the construction of such a conventional liquid crystal light source.

A liquid crystal light source is made such that liquid crystal is enclosed between two transparent substrates as shown in FIG. 18. The liquid crystal light valve is provided with a thin film transistor (hereinafter called TFTs) array substrate 10 and facing substrate 20 which is disposed to face the TFT array substrate.

On the TFT array substrate 10, a plurality of scanning lines 3a and a plurality of data line 6a are disposed so as to cross like in a lattice. A pixel switching TFT 30 is disposed corresponding to the cross points of the scanning lines 3a and the data lines 6a. The scanning lines 3a cross over a semiconductor layer 1a of the TFT 30 via insulating thin layer 2, and channel area 1a' is formed in a crossing area of the semiconductor layer 1a. A data line 6a crossing over the scanning line 3a is connected electrically to a source area 1d of the semiconductor layer 1a via contact hole 5. Also, pixel electrode 9a is formed in an area which is surrounded by the scanning lines 3a and the data lines 6a on an upper layer of the data line 6a. The pixel electrode 9a is connected electrically to a drain area 1e of the semiconductor layer 1a via the contact hole 8. An alignment layer 16 subjected to an alignment layer treatment by a rubbing treatment is formed on the pixel electrode 9a. The alignment layer 16 is formed by an organic layer of polyimide.

In such a TFT array substrate 10, as compared to the area on which the pixel electrode 9a is formed, the thickness of the area in which TFT 30 is a non-pixel area, the thickness of the area in which the scanning line 3a is formed, and the thickness of the area in which data line 6a is formed tends to be large because the insulating layers 4 and 7 for such areas and the wiring are layered therein; thus, the gap section is formed on the surface of the alignment layer 16. The gap is particularly large between the area where the TFT 30 is formed and the area where the pixel electrode 9a is formed.

Furthermore, if a first shading layer 11a is formed under TFT 30 so as to shield a capacity line 3b and TFT 30 for higher quality display, the gap section tends to be reality visible.

Recently, more finely pitched pixels tend to be desired according to the requirements for size reduction of the liquid crystal light source in view of greater fineness and greater brightness of the liquid crystal projector. However, for example, if the pixel pitch becomes as fine as 20 μm, there will be areas where effective rubbing treatment on the alignment layer is impossible because of the gap section on the underlayer of the alignment layer in the case of liquid crystal light valve in which an alignment layer made of an organic layer such as polyimide is provided; thus, disclination of the liquid crystal occurs nearby sometimes degrading display quality. Such a problem becomes more apparent if the pixel pitch is made finer.

Also, the intensity of the light incident on the light valve has increased for brighter liquid crystal projectors. Because of this, the alignment layer made of an organic layer such as of polyimide deteriorates due to light and heat, and alignment uniformity of the alignment layer decreases. Thus, the orientation of the liquid crystal molecules lose uniformity, the contrast of the display decreases, and sometimes ultimately leads to inferior display quality. The reasons such problems occur is that the organic layer made of polyimide absorbs some amount of the 400 to 450 nm wavelength visible light, the alignment layer deteriorates due to the absorption of the light, the orientations of the liquid crystal lose alignment uniformity near the deteriorated area of the alignment layer, and thus degraded display quality results.

In order to solve such problems, a light source has been provided in which the alignment layer is made of a layer obtained by oblique evaporation of inorganic material such silicon oxide (SiO) instead of an organic layer such as polyimide, and in such a way that the liquid crystal molecules are oriented unidirectionally by the surface forming effect of the inorganic oblique evaporation layer. The alignment layer made of an inorganic oblique evaporation layer can be formed by unidirectionally vacuum-evaporating the inorganic material onto a substrate fixed at a certain angle, more specifically from a direction slanted by 10 to 30 degrees to the substrate so as to grow the columnar structure of the inorganic material disposed at a predetermined angle to the substrate, and such a method is called a oblique evaporation method. The alignment layer obtained in this way has advantages such as superior light resistance and heat-resistance as compared to the alignment layer made of an organic material such as polyimide due to its inorganic layer construction, superior durability of the liquid crystal light valve, and loss of alignment uniformity of the liquid crystal caused by incorrect rubbing treatment seen in the case of the organic layer such as one of polyimide, even if the pixel pitch is made finer.

However in contrast to advantages such as light resistance and heat resistance, an alignment layer made of an inorganic layer has disadvantages such as weak alignment uniformity of liquid crystals as compared to an alignment layer made of an organic layer. Accordingly, in a liquid crystal device using an inorganic alignment layer, disclination easily occurs if any factor occurs causing loss of alignment uniformity of the liquid crystals; inferior display is provided. Specifically, surfaces of the active matrix substrate forming the liquid crystal light valve become irregular when forming switching elements such as TFTs, signal lines such as data lines and scanning lines, and pixel electrodes on the active matrix substrate. Such irregularities in the surfaces produce shadows on the substrate during oblique evaporation; thus, defective parts may sometimes be generated on the alignment layer. In the case in which there are such defects on the alignment layer, the organic layer may be able to compensate for the defect by its own sufficient aligning uniformity. However, the aligning uniformity of the inorganic evaporation layer is so weak that disclination may be caused. Because of this tendency, inferior display such as one in which there is light leakage in the domain in which the alignment direction is different occurs, and the display quality decreases due to low contrast.

As a solution for reducing the disclination, there is a method called a pre-tilt method in which the liquid crystal molecules are disposed slant to the surface of the substrate in advance when no voltage is impressed. Generally, the disclination can be progressively reduced as the pre-tilt angle increases. However, if the pre-tilt angle is increased in the case of an inorganic alignment layer in which the aligning uniformity was originally weak, the spiral structure of the liquid crystals between the substrates becomes unstable. Therefore, inferior display is produced due to the existence of reverse twist domains which are areas in which the twisting directions of liquid crystals becomes partially opposite.

This problem also occurs in liquid crystal devices using alignment layers made of an inorganic oblique evaporation layer formed on the underlayer on which surface the gap section exists.

Above problem is not limited to the case of an active matrix type liquid crystal device using a 3-terminal-type-element such as a TFT element; but it is a common problem among active matrix type liquid crystal devices using 2-terminal-type-elements such as a Thin-Film-Diode (hereinafter called TFD) and passive matrix type liquid crystal devices whenever an inorganic alignment layer is used in the liquid crystal device.

SUMMARY OF THE INVENTION

This invention was made in consideration of solving the above problems, and an object of the invention is to minimize the inferior alignment of liquid crystals in the liquid crystal device using an inorganic alignment layer in which alignment uniformity is poor, and to provide a liquid crystal device which can prevent inferior display and low contrast due to the inferior alignment, and also to provide a projection display device in which display quality is high by using the above liquid crystal device.

Also, an object of this invention is to provide a liquid crystal device by which inferior evaporation areas of inorganic materials is not generated near the gap section of the underlayer of the alignment layer even if pixel elements are as fine as 20 μm or less, to prevent the occurrence of inferior alignment of the liquid crystals due to the irregularities in the alignment layer due to inferior evaporation areas of inorganic material, and to reduce the occurrence of inferior display. A manufacturing method for a substrate for such a liquid crystal device is another object of the present invention.

In order to achieve the above objects, a liquid crystal device of this invention is characterized in that a liquid crystal layer (50) is disposed between a pair of substrates (20) facing each other, inorganic alignment layers (36, 42) are disposed on a surface of a liquid crystal layer side of the pair of the substrates, average pre-tilt angle θ of liquid crystal molecule 50*a* of the liquid crystal layer is 5 degrees≦θ≦20 degrees, twist angle φ of the liquid crystal molecule (50*a*) of the liquid crystal layer, cell gap d, and helical pitch P of the liquid crystal molecule of the liquid crystal layer satisfy the Relationship R1 of (0.6/360)φ<d/P<(1.4/360)φ.

Also, a liquid crystal device of the present invention is characterized in that a liquid crystal layer (50) is disposed between a pair of substrates (20) facing each other, inorganic alignment layers (36, 42) are disposed on a surface of a liquid crystal layer side of the pair of the substrates, average pre-tilt angle θ of liquid crystal molecule 50*a* of the liquid crystal layer is θ>20 degrees, twist angle φ of the liquid crystal molecule (50*a*) of the liquid crystal layer, cell gap d, and helical pitch P of the liquid crystal molecule of the liquid crystal layer satisfy the Relationship RELATIONSHIP 2 of (0.8/360)φ<d/P<(1.6/360)φ.

In order to avoid inferior alignment caused by the weak alignment uniformity of the inorganic alignment layer in a liquid crystal device using the inorganic alignment layer, the inventors examined a feature of the liquid crystal material such as the "helical pitch" after various experiments and research, and they discovered that inferior alignment can be prevented in the liquid crystal device which uses an inorganic alignment layer by setting the ratio between the cell gap of the liquid crystal device and the helical pitch of the liquid crystal layer in a predetermined range of values. By doing this, a liquid crystal device can be realized with no inferior display characteristics such as light leakage due to disclination and reduced contrast. The helical pitch being described here is the length of the liquid crystal layer corresponding to 360 degrees of unidirectional rotation of the major axis of liquid crystal molecules in a liquid crystal layer under conditions that the alignment uniformity is not given. Reasons for determining the range of d/P ratio between cell gap d and helical pitch P is explained with reference to experimental results.

According to data from experiments by the inventors of the present invention, as mentioned above, the d/P ratio between cell gap d and helical pitch P can be generalized in two different formulae such as the above Relationships RELATIONSHIP 1 and RELATIONSHIP 2 according to the two different ranges of the average pre-tilt angle θ of liquid crystal molecules in a liquid crystal layer such as 5 degrees≦θ≦20 degrees and θ>20 degrees. In the case of the inorganic alignment layer, the columnar structure which forms the alignment layer sometimes becomes uneven corresponding to a factor such as the surface shape of the substrate when forming the alignment layer, particularly in an oblique evaporation method. Thus, according to such conditions, a phrase such as "average pre-tilt angle" is used herein because it is anticipates that the pre-tilt angle will differ according to the position on the substrate, and RELATIONSHIP 1 and RELATIONSHIP 2 may preferably be selected according to the pre-tilt angle which is determined as an average tilt-angle of the entire substrate.

In order to control the pre-tilt angle on an inorganic alignment layer, various methods can be employed. Typically, a pre-tilt angle of 5 degrees≦θ≦20 degrees can be obtained relatively easily with the forming method of the alignment layer by forming an inorganic evaporation layer by evaporation of inorganic material onto the substrate unidirectionally, by evaporating in a vacuum condition for a second time from a different angle inside the substrate, and by forming another inorganic evaporation layer on the inorganic evaporation layer. In order to describe a structure of the alignment layer, the inclination direction of the columnar structure of an inorganic material which is made of two layers of an oblique evaporation layer having a columnar structure of inorganic material slanting in one direction to form both oblique evaporation layers can realize a pre-tilt angle such as 5 degrees≦θ≦20 degrees as long as it is an alignment layer in which azimuth angle directions inside the substrate plane are different.

Also, in contrast to the above evaporations performed twice, a pre-tilt angle such as θ>20 degrees can be relatively easily obtained if the alignment layer is formed once by evaporation. In order to describe a structure of the alignment layer, a pre-tilt angle such as θ>20 degrees can be realized as long as the alignment layer is made of a columnar structure of an oblique evaporation layer made of inorganic material slanting unidirectionally.

For specific materials for the inorganic alignment layer, silicon oxide (SiO), Titanium oxide ($TiO_2$), Magnesium fluoride (MgF) can be used, and SiO is used most commonly.

A projection display device of the present invention is provided with any of the liquid crystal devices of the present invention, and a projection display device of the present invention is characterized in comprising a light source, the liquid crystal device which modulates the light emitted from the light source and a magnifying projection optical system which magnifies the light modulated by the liquid crystal device and projects the light onto a projection screen.

According to this construction, by using a liquid crystal device of the present invention, a projection display device with no low contrast due to inferior alignment of the liquid crystal can be realized with a high quality display.

Also, various experiments have been performed and the result of the experiments have been evaluated by the inventors of the present invention so as to prevent the occurrence or inferior alignment layer due to a defective area of evaporation of inorganic material generated in or near the gap section of the underlayer of alignment layer formed by an inorganic oblique evaporation layer. The reason is that the evaporation is hardly possible in the area shaded by the gap section on the surface of the underlayer of the alignment layer; thus, such area becomes a evaporation defect area when an element substrate on which a plurality of wiring and a plurality of insulating layers are formed is fixed at a certain angle and then forming an alignment layer by unidirectional evaporation of an inorganic material.

Furthermore, after the various experiments and the evaluation of the result of the experiments, the inventors of the present invention discovered that it is desirable to alter the azimuth angle direction of the oblique evaporation of which the direction is at least along the surface inside the surface of the substrate when the underlayer of the inorganic alignment layer made of an inorganic oblique evaporation layer formed on the substrate has the gap section on the surface of the substrate, and to perform the oblique evaporation two or more times. In more detail, the inventors discovered a method such as forming the first inorganic oblique evaporation layer by the oblique evaporation of inorganic material unidirectionally onto the substrate on which surface the underlayer having the gap section is formed, and forming the second inorganic oblique evaporation layer in an area close to the gap section and on the first inorganic oblique evaporation layer by the oblique evaporation of inorganic material from a direction in which the azimuth angle direction inside the plane of the substrate is at least different from the direction of the oblique evaporation of inorganic material in the forming step of the first oblique evaporation layer. According to this method, the first and the second inorganic oblique evaporation layers are formed by the columnar structure of the slant inorganic material. The slanting direction of the columnar structure of inorganic material which forms the first inorganic oblique evaporation layer, and the slanting direction of the columnar structure of inorganic material which forms the second inorganic oblique evaporation layer are different in that the azimuth angle directions along the direction inside the surface of the substrate are different. In a liquid crystal device in which the inorganic alignment layer having such first and second inorganic oblique evaporation layers are formed, the above problems are solved.

In addition, in the case of forming an alignment layer for a liquid crystal panel by an oblique evaporation layer made of SiO, the method in which the oblique evaporation is performed twice is known from the disclosure in IEEE Trans. Electron. Devices, Vol. ED-24(7), 805(1977) by M. R. Johnson and P. A. Penz. However, the liquid crystal device of this disclosure is a single matrix type direct-view liquid crystal panel. This liquid crystal device is not as small as a liquid crystal device for a projection light source in a liquid crystal projector of this invention, and this liquid crystal device is not an active matrix type liquid crystal panel in which the pixel pitch of pixel electrodes is as fine as 20 μm and the underlayer of the alignment layer has a gap section due to the scanning lines and the data lines.

Also, an object of performing the oblique evaporation twice in the above conventional art was to make the pre-tilt angle of the liquid crystal molecules less than 20 degreesin a simple matrix type direct-view liquid crystal panel. Thus, in the case in which the gap on the surface of the underlayer of the inorganic alignment layer is large, preventing the occurrence of defect evaporation areas of inorganic material in areas close to the gap section was not treated previously.

In order to achieve the above objects, in a liquid crystal device of present invention, a liquid crystal layer is disposed between a pair of substrates facing each other; inorganic alignment layers are disposed on a surface of a liquid crystal layer side of the pair of the substrates, and an underlayer of at least one of the inorganic alignment layers have a gap section. Additionally, the inorganic alignment layers formed on the underlayer having the gap section comprise a first inorganic oblique evaporation layer and a second inorganic oblique evaporation layer formed in an area close the gap section and on the first inorganic oblique evaporation layer. The first and the second inorganic oblique evaporation layers are made of slanted columnar structures of inorganic material. Azimuth angle directions of the slanting direction of the columnar structure of an inorganic material forming both the first and the second oblique evaporation layers are different inside the plane of the substrate.

According to the liquid crystal device with such a construction, inorganic alignment layers formed on the underlayer having the above gap section comprises the first inorganic oblique evaporation layer formed by a columnar structure of slant inorganic material and the second inorganic oblique evaporation layer, and the slant direction of inclination of the columnar structure of inorganic material of the second inorganic oblique evaporation layer is different from the slant direction of the columnar structure of the first inorganic oblique evaporation layer, at least with regard to the azimuth angle direction. Also, because the second inorganic oblique evaporation layer is formed in an area close to the above gap section, even if a pixel pitch as fine as 20 μm or less is formed, the occurrence of uneven evaporation of inorganic material or insufficient evaporation in areas close to the above gap section can be reduced. Accordingly, even if the pixel pitch is as fine as 20 μm or less, the inorganic alignment layer formed on the underlayer having a gap section on the surface of underlayer can be free from defects, the defective alignment of liquid crystals due to a defective alignment layer can be prevented, and the occurrence of defective display, such as lowered contrast, can be prevented. Such effects can also be obtained even if the pixel pitch is as fine as 15 μm or less.

Also, in a liquid crystal device in this invention, a liquid crystal layer is disposed between a pair of substrates facing each other, a plurality of pixel electrode is disposed in a matrix, a plurality of switching devices which drive the plurality of the pixel electrodes, and a plurality of data lines and a plurality of scanning lines connected respectively to the plurality of the switching devices are provided on either one of the two substrates. Facing electrodes are provided on the other substrate, inorganic alignment layers are provided respectively on the surface of the liquid crystal side of the two substrates, and an underlayer of at least one of the inorganic alignment layer on the side of which the switching device is provided has a gap section on its surface. Inorganic alignment layers formed on the underlayer having gap sections comprising a first inorganic oblique evaporation layer and a second inorganic oblique evaporation layer formed in an area close to the gap section and on the first inorganic oblique evaporation layer. The first and the second inorganic oblique evaporation layers are made of an slant columnar structure of inorganic material. Azimuth angle directions of the direction of inclination of the columnar structure of inorganic material constructing both the first and the second oblique evaporation layers are different along the inside plane direction of the substrate.

In such a liquid crystal device, an inorganic alignment layer formed on the underlayer having the above gap section comprises the first inorganic oblique evaporation layer formed by a columnar structure of slant inorganic material and the second inorganic oblique evaporation layer, and the direction of inclination of the columnar structure of the inorganic material of the second inorganic oblique evaporation layer is different from the direction of inclination of the columnar structure of the first inorganic oblique evaporation layer at least with regard to the azimuth angle direction. Additionally, because this second inorganic oblique evaporation layer is formed in an area close to the above gap section, the occurrence of uneven evaporation of inorganic material or insufficient evaporation in areas close to the above gap section can be reduced. Accordingly, even if the pixel pitch is as fine as 20 μm or less, an inorganic alignment layer formed on the underlayer having a gap section on the surface of the underlayer can be free from defects, the defective alignment of liquid crystals due to the defective alignment layer can be prevented, and the occurrence of defective display, such as lowered contrast can be prevented. Such effects can also be obtained even if the pixel pitch is as fine as 15 μm or less.

In addition, in this invention, components on the substrate on which switching devices are provided for constructing the pixels are scanning lines (gates) and data lines, the switching devices connected to these lines, pixel electrode, and supplementary capacity (accumulation capacity) and the like. On the substrate on which the facing electrodes are provided, constituting parts of pixels are shading layers (black matrix), facing electrodes and the like. Pixel pitch is, for example, the pixel electrode pitch or the like.

Also, in a liquid crystal device with any structure of present invention, the inclination direction of a columnar structure of an inorganic material forming the above first inorganic oblique evaporation layer and the direction of the inclination of the columnar structure of the inorganic material forming the above second inorganic oblique evaporation layer can differ by 90 degrees with regard to the azimuth angle direction. In the case of an ordinary active matrix type liquid crystal device, data lines and scanning lines are crossing in nearly an orthogonal manner such as in a matrix, and an alignment layer can be disposed securely in an area close to gap sections crossing each other by twice performing evaporation from the direction of which azimuth angle direction differs by 90 degrees.

Also, in a liquid crystal device with any structure of the present invention, the thickness of the first inorganic oblique evaporation layer should preferably be 5 nm to 16 nm, and the thickness of the second inorganic oblique evaporation layer should preferably be 10 nm to 40 nm.

If the thickness of the first inorganic oblique evaporation layer is less than 5 nm, the pre-tilt angle is not arranged for the liquid crystal molecule, and such a condition may cause disclination. If the thickness is larger than 16 nm, the effect which should be obtained by the second inorganic oblique evaporation layer cannot be obtained sufficiently; thus, the pre-tilt angle of liquid crystal molecules becomes larger than 20 degrees.

If the thickness of the second inorganic oblique evaporation layer is less than 10 nm, the effect that the columnar structure of this second inorganic oblique evaporation layer fills the gap of the columnar structure of inorganic material forming the first inorganic oblique evaporation layer is insufficient; thus the pre-tilt angle of the liquid crystal molecules becomes larger than 20 degrees. If the thickness of the second inorganic oblique evaporation layer is larger than 40 nm, the gap of the columnar structure of the inorganic material forming the first inorganic oblique evaporation layer is filled; thus, the pre-tilt angle is not disposed on the liquid crystal molecule, and therefore there is no pre-tilt in alignment.

Also, in a liquid crystal device with any construction of the present invention, the average pre-tilt angle of the liquid crystals of the above liquid crystal layer should preferably be 5 degrees to 15 degrees.

Also, in a liquid crystal device with any construction of the present invention, an oblique evaporation layer made of silicon oxide can be used for the above inorganic alignment layer.

In the manufacturing method for the substrate a for liquid crystal device by oblique evaporation of inorganic material on an underlayer having a gap section on the surface formed on the substrate so as to form the inorganic alignment layers, a manufacturing method for a substrate for a liquid crystal device of the present invention is characterized in comprising a first oblique evaporation step by unidirectional oblique evaporation of the inorganic material on the substrate on which the underlayer having the gap section is formed on the surface of the substrate so as to form the first inorganic oblique evaporation layer, a second oblique evaporation step by oblique evaporation of inorganic material from at least a different azimuth angle inside the substrate from the oblique evaporation direction of the inorganic material in the first oblique evaporation step so as to form the second oblique evaporation layer in an area close to the gap section and on the first inorganic oblique evaporation layer.

According to such a manufacturing method for a substrate for a liquid crystal device, the first and the second oblique evaporation steps are arranged, the oblique evaporation direction of the inorganic material in the first oblique evaporation step and the oblique evaporation direction of inorganic material in the second oblique evaporation step are different with regard to at least the azimuth angle direction along an inside surface direction of the substrate. Therefore, even if there is such an area in which inorganic material is not vacuum deposited in the first oblique evaporation step, inorganic material can be vacuum deposited to such area in the second oblique evaporation step. In the first oblique evaporation step, an area close to the gap section may be in the shadow; thus, there may be an area in which the first inorganic oblique evaporation layer is not formed. In the second oblique evaporation step, by performing the oblique evaporation of inorganic material at a different azimuth angle direction from the azimuth angle direction employed in the first oblique evaporation step, the second inorganic oblique evaporation layer can be formed by performing the evaporation of inorganic material onto the area where an inorganic oblique evaporation layer is not formed due to the shadow by the gap section in the first oblique evaporation step. Also, in this second oblique evaporation step, the second inorganic oblique evaporation layer is formed not only in an are close to the gap section, but also on the first inorganic oblique evaporation layer on at least both sides of the gap section. According to the manufacturing method for a substrate for a liquid crystal device with such a construction, a substrate for a liquid crystal device which can be provided for a liquid crystal device with any construction of the present invention can be manufactured.

Also, in the manufacturing method for a substrate for a liquid crystal device with the above construction in the present invention, the first inorganic oblique evaporation layer can be preferably formed, the second inorganic oblique evaporation layer can be preferably formed in an area close to the gap section and on the first inorganic oblique evaporation layer; thus, the direction of oblique evaporation of inorganic material in the first oblique evaporation step and the direction of oblique evaporation of inorganic material in the second oblique evaporation step should preferably differ by approximately or exactly 90 degrees with regard to the azimuth angle direction. In the case of an ordinary active matrix type liquid crystal device, data lines and scanning lines cross nearly orthogonally in a matrix; thus, an alignment layer can be reliably formed in an area close to each gap section crossing each other by performing evaporation twice from different azimuth angle directions.

Also, in a manufacturing method for a substrate for a liquid crystal device with any construction of the present invention, deposition angle of inorganic material of the first oblique evaporation from the substrate should preferably be 5 degrees to 10 degrees, and the deposition angle of inorganic material of the second oblique evaporation from the substrate should preferably be 25 degrees to 30 degrees.

If the deposition angle of the oblique evaporation direction in the first oblique evaporation from the substrate is less than 5 degrees, the density of the columnar structure formed is too low; thus the alignment direction of the liquid crystal molecules becomes unstable, and the alignment uniformity inside the plane along the inside plane direction of the substrate is lost.

If the deposition angle of oblique evaporation direction from the substrate is larger than 10 degrees, the density of the columnar structure formed becomes high, and the effect that the gap of the columnar structure of the first inorganic oblique evaporation layer is filled by the columnar structure of the second inorganic oblique evaporation layer can hardly be obtained; thus, as a result, the area where there is no pre-tilt in the alignment of liquid crystal molecule expands when manufacturing the liquid crystal device with this substrate.

If the deposition angle of oblique evaporation direction from the substrate in the second oblique evaporation step is less than 25 degrees, the effect that the gap of the columnar structure of the first inorganic oblique evaporation layer is filled by the columnar structure of the second inorganic oblique evaporation layer can hardly be obtained. If the deposition angle of the oblique evaporation from the substrate is larger than 30 degrees, anisotropy in the formed layer is lost; thus, the function of aligning the liquid crystal molecule is lost.

Also, in a manufacturing method for a substrate for a liquid crystal device with any construction of the present invention, in either one of the first oblique evaporation step or the second oblique evaporation step, the oblique evaporation direction should preferably be selected according to the construction and the disposition of the gap section formed on the surface of the underlayer in that the effect that the inorganic oblique evaporation layer can be formed separately by performing the oblique evaporation twice can be enhanced in the oblique evaporation of the inorganic material. For example, in a case in which there are high gap sections and low gap sections on the surface of the underlayer, oblique evaporation of inorganic material should preferably be performed from the direction of the low gap section in the first oblique evaporation step, and oblique evaporation of inorganic material should preferably be performed from a direction such that the azimuth angle direction along the inside plane direction of the substrate is at least different from the oblique evaporation direction of inorganic material in the first oblique evaporation step in the second oblique evaporation step. As mentioned above, the first oblique evaporation step is performed on the surface of the substrate at a narrow angle, and the second oblique evaporation step is performed on the surface of the substrate at a wide angle. In such a case, the shaded part which is a shadow in the first oblique evaporation step, such as no-inorganic-layer area, becomes small; thus, the alignment layer is formed more reliably.

Also, the reason the oblique evaporation should be performed according to above method is understandable according to following.

As shown in FIG. 16, the Relationship among $\theta$ as an evaporation angle of silicon oxide, $\Delta Z$ as a height of the gap between wiring 9c and surface of substrate 10a, $\Delta L$ as a width of a non-alignment-layer area where an inorganic oblique evaporation layer is not formed due to the shade of the gap was researched under conditions that the wiring 9c is formed on the surface of the substrate 10d, and the oblique evaporation of silicon oxide (SiO) is performed on the surface of the substrate 10d from a unidirectional direction S. The result of the above research is shown in FIG. 17. The oblique evaporation direction S is an orthogonal direction to the wiring 9c.

As shown in FIG. 17, $\Delta L$ as a width of a non-alignment-layer area where an inorganic oblique evaporation layer is not formed increases according to $\Delta Z$ as the height of the gap without regard to the oblique evaporation angle S. Therefore, it is understood from above result that $\Delta L$ as a width of a non-alignment-layer area where an inorganic oblique evaporation layer is not formed can be decreased by performing the oblique evaporation of inorganic material from the direction of the low gap section in the first oblique evaporation step; thus, the alignment layer can be formed as large as possible in the first oblique evaporation step, and the area which should be compensated for in the second oblique evaporation step can be lessened.

Also, in a manufacturing method for a substrate for a liquid crystal device with any construction in the present invention, of the thickness of inorganic oblique evaporation layer formed in the first oblique evaporation step should preferably be 5 nm to 16 nm, and the thickness of inorganic oblique evaporation layer formed in the second oblique evaporation step should preferably be 10 nm to 40 nm.

If the thickness of the first inorganic oblique evaporation layer is less than 5 nm, a pre-tilt angle is not provided to the liquid crystal molecules, and such a condition may cause disclination. If the thickness is larger than 16 nm, the effect which should be obtained by the second inorganic oblique evaporation layer cannot be obtained sufficiently; thus, the pre-tilt angle of liquid crystal molecules becomes larger than 20 degrees.

If the thickness of the second inorganic oblique evaporation layer is less than 10 nm, the effect that the columnar structure of this second inorganic oblique evaporation layer fills the gap of the columnar structure of inorganic material organizing the first inorganic oblique evaporation layer is insufficient; thus the pre-tilt angle of the liquid crystal molecule becomes larger than 20 degrees. If the thickness of the second inorganic oblique evaporation layer is larger than 40 nm, the gap of the columnar structure of inorganic material organizing the first inorganic oblique evaporation layer is filled; thus, the pre-tilt angle is not provided to the liquid crystal molecules, therefore there is no pre-tilt in alignment.

Also, in a manufacturing method for a substrate for a liquid crystal device with any construction in the present invention, silicon oxide can be preferably used as the above inorganic material.

A projection display device of the present invention is provided with any of the liquid crystal devices of the present invention, and a projection display device of the present invention is characterized in comprising a light source, the liquid crystal device which modulates the light emitted from the light source, and a magnifying projection optical system which magnifies the light modulated by the liquid crystal device and projects the light on a projection plane.

According to the projection display device with this construction in the present invention, by using the liquid crystal device of any of the present invention, a projection display device having high display quality with no low contrast due to inferior alignment of liquid crystals can be realized.

DETAILED DESCRIPTION OF THE INVENTION

First Embodiment

The structure of a liquid crystal device in a first embodiment of the present invention will be explained with reference to FIGS. 1 to 8. The liquid crystal device in this embodiment of the present invention is an example of an active matrix type liquid crystal device of which is to be used as a light valve of a projection liquid crystal display device.

Figure 1:
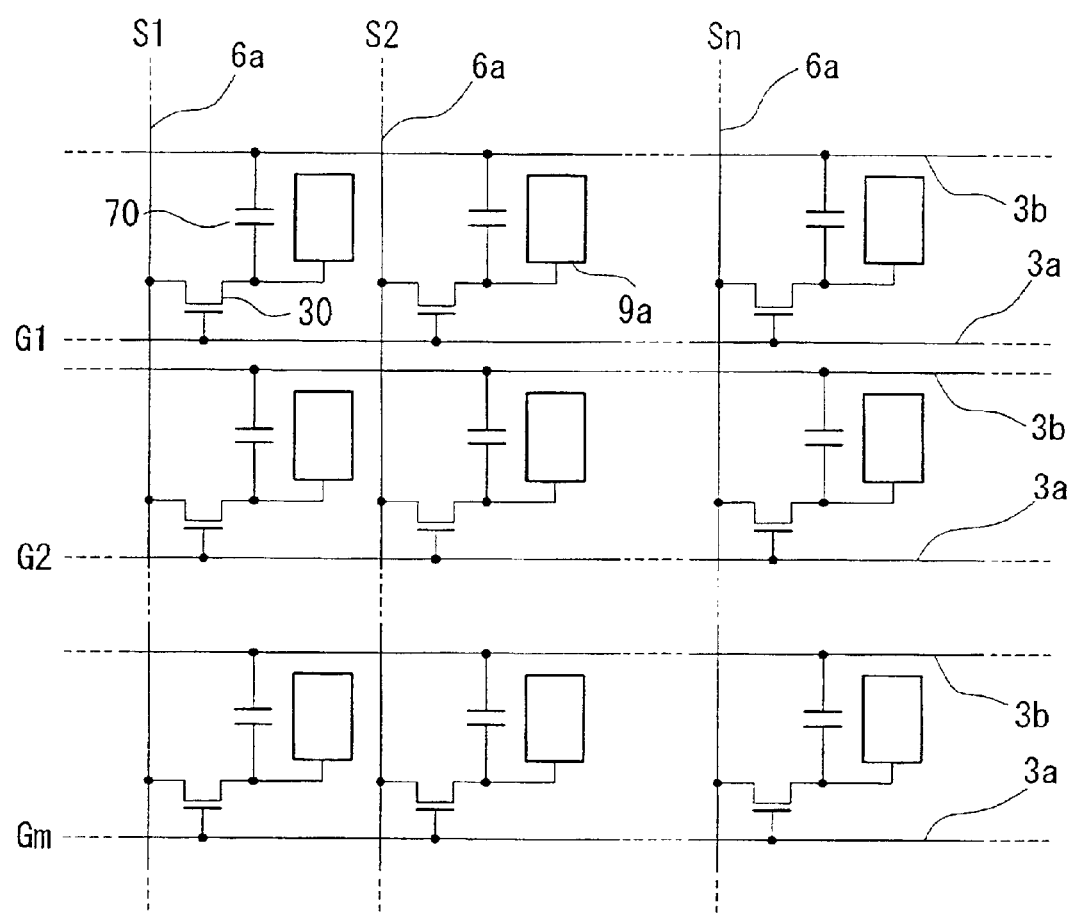
FIG. 1 is a similar circuit showing various elements and wirings provided in a plurality of pixels in a matrix which forms the picture display area of liquid crystal devices in the first and the third embodiments of the present invention.
Figure 2:
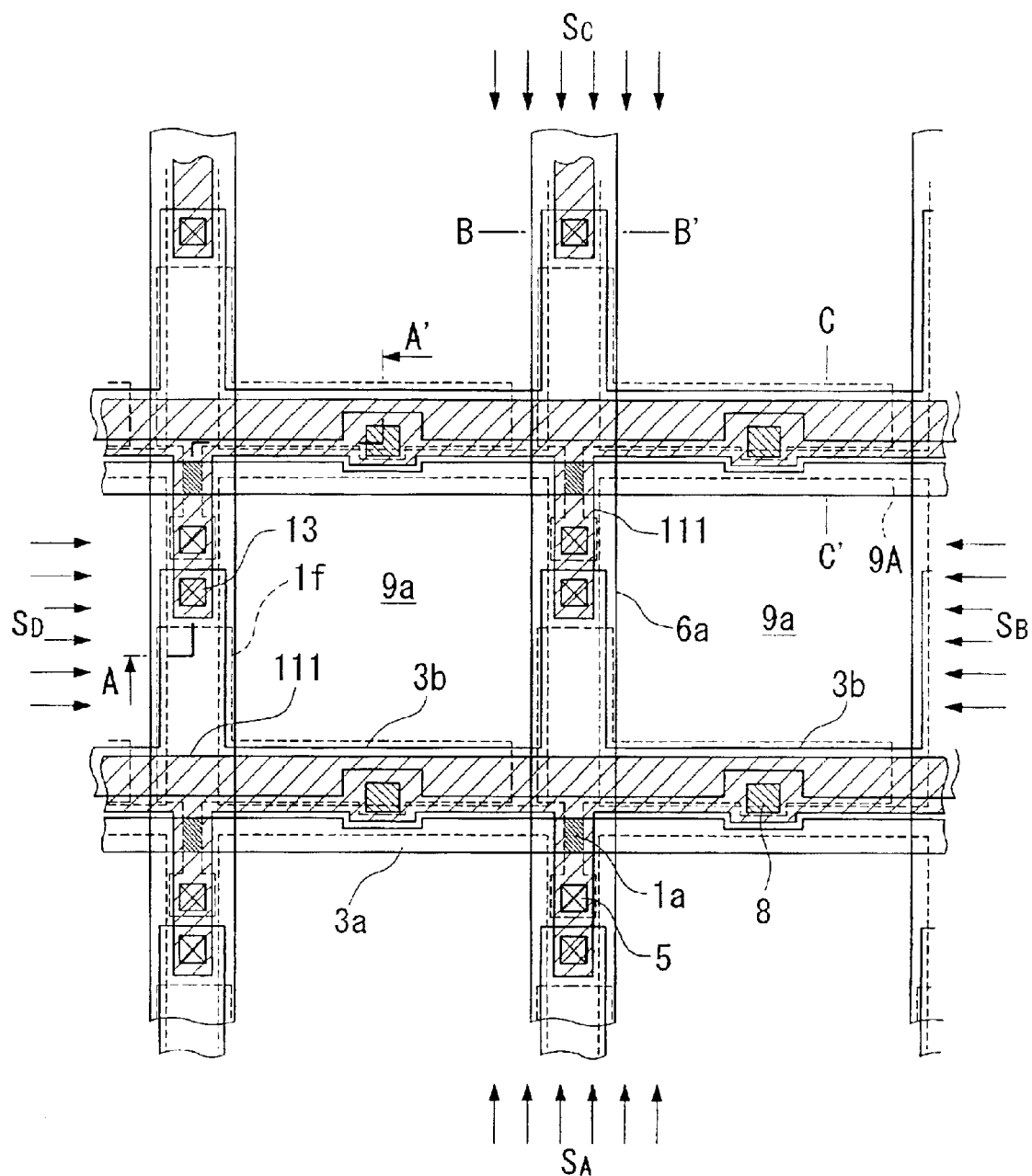
FIG. 2 is a plan view showing a plurality of a group of pixels neighboring each other on a TFT array substrate of a liquid crystal device.
Figure 3:
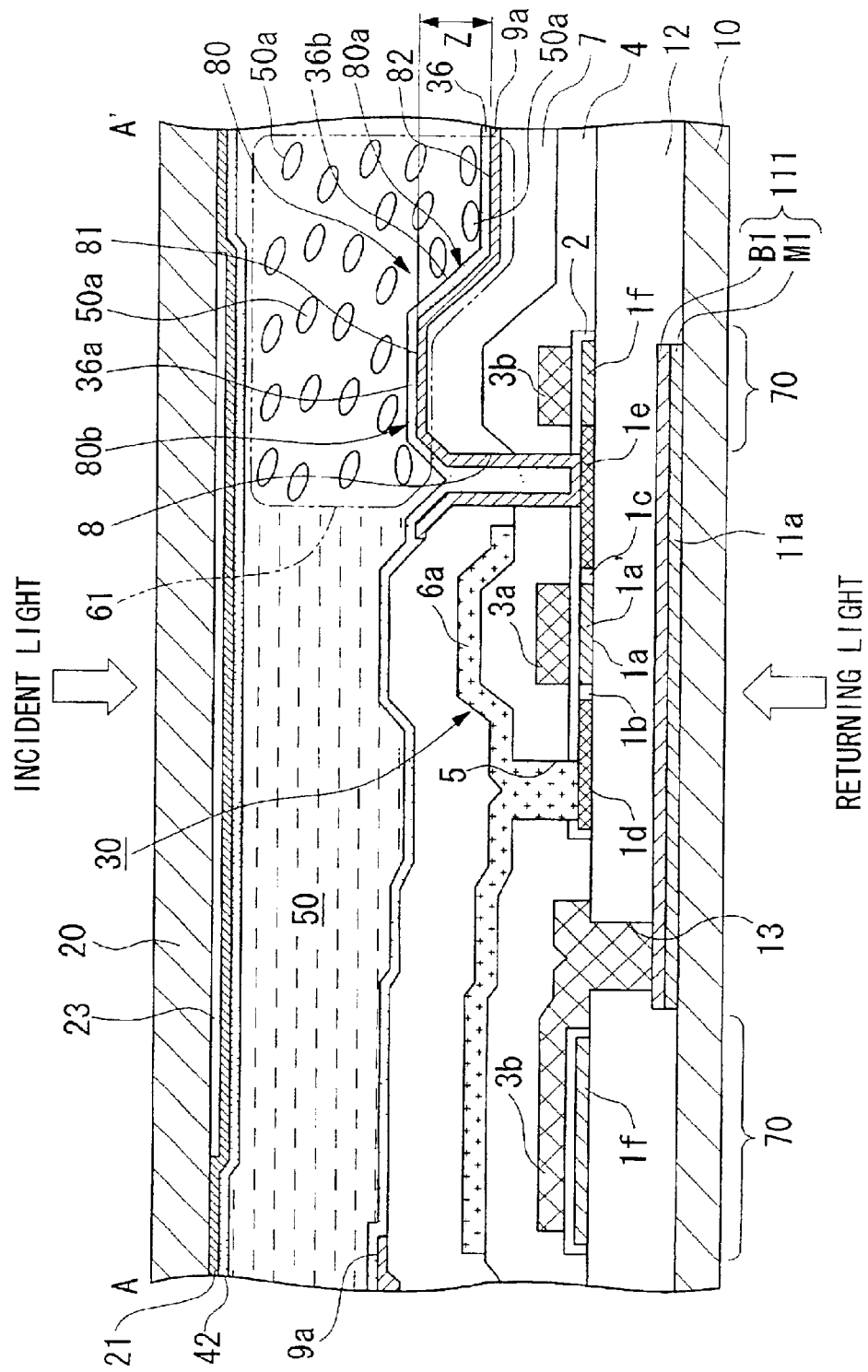
FIG. 3 is a cross section along line A–A' in FIG. 2.

FIG. 1 is a drawing showing an equivalent circuit such as various elements and wirings provided in a plurality of pixels in a matrix which forms the picture display area of the liquid crystal device. FIG. 2 is a plan view showing a plurality of a group of pixels neighboring each other on the TFT on which data lines, scanning lines, and pixel electrodes are formed. FIG. 3 is a cross section along line A–A' in FIG. 2, and FIG. 4 is a cross section along line C–C' in FIG. 2.

Figure 4:
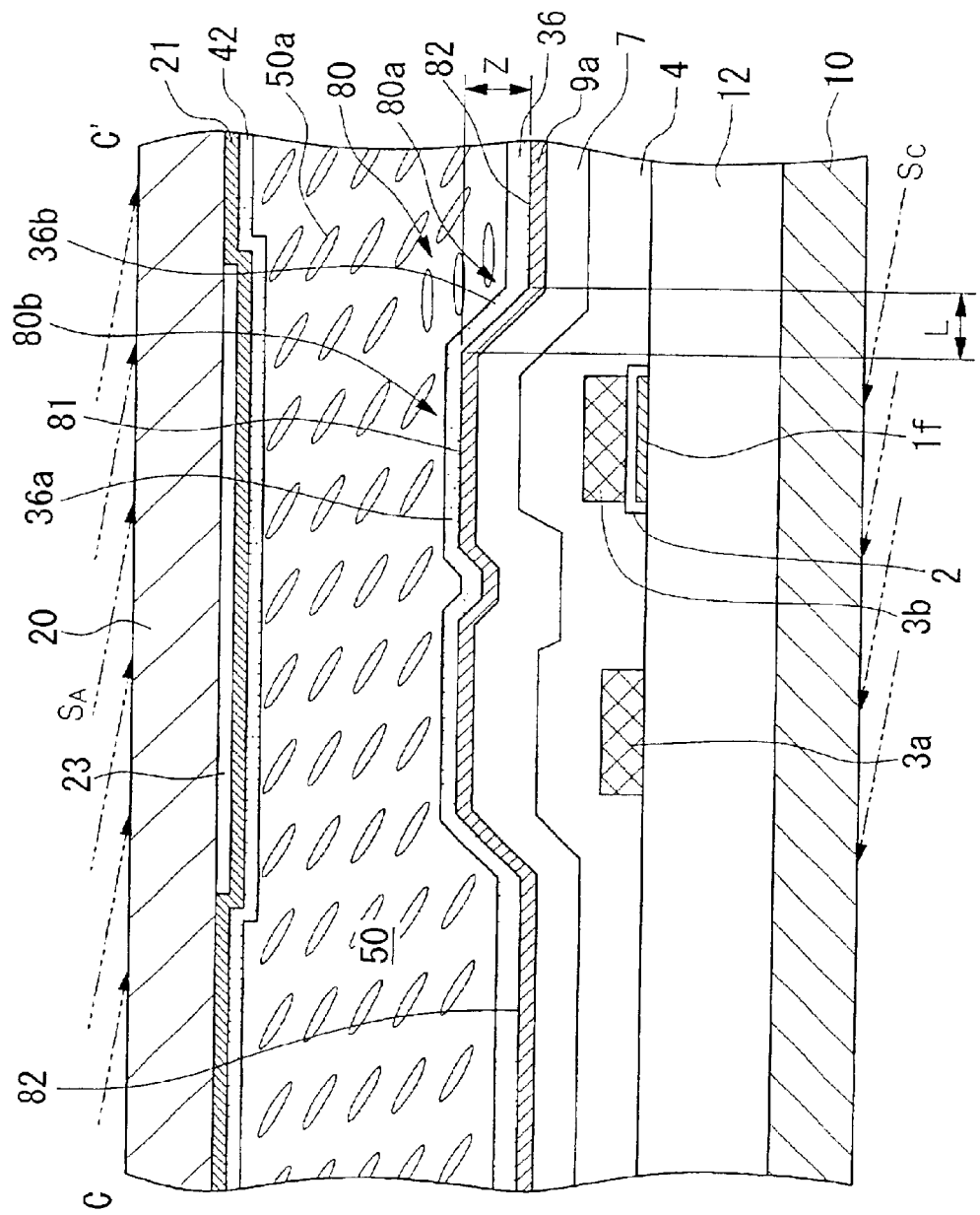
FIG. 4 is a cross section along line C–C' in FIG. 2.

In FIGS. 3 and 4, the reduced scale is different based on each layer and each element for the purpose of enabling each layer and each element to be visible in the drawings. Also, in FIG. 3, the alignment condition of the liquid crystals of each liquid crystal layer is graphically shown only as an area surrounded by double-dotted line 61; thus, the alignment condition of liquid crystal molecules of the rest of such areas are omitted in the drawing.

As shown in FIG. 1, on a plurality of pixels formed in a matrix and forming the pixel display area of a liquid crystal device of the present embodiment, a plurality of pixel electrodes 9a and a plurality of TFTs 30 for pixel switching for controlling the pixel electrodes 9a are formed in a matrix, and data lines 6a supplying picture signals are connected electrically to the source areas of the TFTs 30.

Pixel signals S1, S2, to Sn which are to be written in data line 6a may be supplied in sequential order of lines, also pixel signal 5 may be supplied per group made of data lines 6a neighboring each other. Also, the scanning line 3a is connected electrically to the gate of TFT 30, scanning signals G1 and G2 to Gm are impressed according to the scanning line 3a in pulses in this sequential order of line at a predetermined timing. The pixel electrode 9a is connected electrically to the drain area of pixel switching TFT 30, picture signals S1 and S2 to Sn supplied from the data line 6a is written at a predetermined timing by opening the TFT 30 as a switching element only for a predetermined period of time. Picture signals S1 and S2 to Sn which were written via pixel electrodes 9a with a predetermined level are retained between facing electrodes formed on the facing substrates for a predetermined period of time. Facing electrodes and facing substrates are explained in detail later. Here, accumulating capacity 70 is added in a row with a liquid crystal capacity formed between the pixel electrodes 9a and the facing electrodes so as to prevent the leaking of the retained picture signal. For a method of forming the accumulating capacity 70, capacity line 3b which is a wiring for forming the capacity between semiconductor layers is provided. Also, instead of providing the capacity line 3b, the capacity may be formed between the pixel electrode 9a and the scanning line 3a which is in the previous stage.

Next, according to FIG. 2, plan construction inside the pixel area (picture display area) of TFT array substrate of the liquid crystal device of the present embodiment is explained in detail.

As shown in FIG. 2, on the TFT array substrate of the liquid crystal device, a plurality of transparent pixel electrodes 9a are provided in a matrix, and the outline of the pixel electrode is shown by a dotted-line 9a'. Data line 6a, scanning line 3a and capacity line 3b are provided along the horizontal border and vertical border of pixel electrode 9a. Data line 6a connected electrically to the source area described below of any one of the semiconductor layers 1a made of polysilicon via a contact hole 5, and the pixel electrode 9a is connected electrically to any one of the drain area of the semiconductor layer 1a via a contact hole 8. The pitch of the pixel electrode is supposed to be 20 μm or lower, and more preferably, the pitch of the pixel electrode is supposed to be 15 μm or lower. Also, the scanning line 3a is disposed so as to face towards a channel area as shown in an angular perspective view in FIG. 2 (explained later) among the semiconductor layer 1a; thus, the scanning line 3a itself functions as a gate electrode.

The capacity line 3b has a main line section extending almost linearly along the scanning line 3a (in other words a first area formed along the scanning line 3a in plan view) and a projection section (in other words, a second area extending along the data line 6a in plan view) projected to the side of the previous stage (upward direction in FIG. 2) along the data line 6a from the crossing point with the data line 6a. Additionally, in the area shown by angular perspective in FIG. 2, a plurality of first shading layers 111 are provided. More specifically, the first shading layer 111 is provided in a position for covering the TFT including the channel area of the semiconductor layer 1a in the pixel area viewed from the side on which the TFT array substrate is provided. Furthermore, the first shading layer 111 has a main line section extending linearly along the scanning line 3a so as to face towards the main line section of the capacity line 3b and projection section which is projecting to the latter stage (downward direction in FIG. 2) neighboring along the data line 6a from the crossing point with the data line 6a. The tip of the downward projection section in each stage (each pixel line) of the first shading layer 111 is overlapping with the tip of the upward projection section of the capacity line 3b in the next stage under the data line 6a. In this overlapping point, a contact hole 13 which connects the first shading layer 111 and the capacity line 3b electrically and respectively is provided. That is, in the present embodiment, the first shading layer 111 is connected to the capacity line 3b of the previous or latter stage electrically by a contact hole 13.

Next, regarding the cross sectional structure, as shown in FIG. 3, the liquid crystal device of present embodiment has a pair of transparent substrate, the TFT array substrate 10 as one side of the substrates and the facing substrate 20 as the other substrate so as to be disposed to face the TFT array substrate 10 are provided. On TFT array substrate 10, pixel electrode 9a made of a transparent conductive layer such as indium tin oxide (hereinafter called ITO) as an example is provided, and TFT 30 for switching to control each pixel electrode 9a is provided in position neighboring each pixel electrode 9a on the TFT array substrate 10. TFT 30 has an LDD (lightly doped drain) construction, and TFT array substrate 10 is provided with a scanning line 3a, a channel area 1a' of the semiconductor layer 1a on which a channel is formed by the electric field from the scanning line 3a, an insulating layer 2 which insulates the scanning line 3a from the semiconductor layer 1a, a data line 6a, a low density source area 1b of the semiconductor layer 1a, a low density drain area 1c of the semiconductor layer 1a, high density source area 1d of the semiconductor layer 1a, and high density drain area 1e of the semiconductor layer 1a.

Also, on the scanning line 3a and on the TFT array substrate 10 including the insulating layer 2, the second insulating layer 4 on which a contact hole 5 communicating with the high density source area 1d and a contact hole 8 communicating with the high density drain area 1e are respectively formed is formed. That is, the data line 6a is connected to the high density source area 1d electrically via the contact hole 5 penetrating through the second insulating layer 4. Additionally, on the data line 6a and on the second insulating layer 4, a third insulating layer 7 on which the contact hole 8 communicating with the high density drain area 1e is formed. That is, the high density drain area 1e is connected to the pixel electrode 9a electrically via the contact hole 8 penetrating through the second insulating layer 4 and the third insulating layer 7. The third insulating layer 7 and the pixel electrode 9a are the underlayer of the inorganic alignment layer 36 which is mentioned later, the surface of the underlayer has the gap section 80 made by the scanning line 3a and the capacity line 3b. The height Z of the gap section 80 made on the surface of the underlayer is 200 μm to 600 μm under condition that the pixel pitch is 15 μm or the like.

Also, the accumulating capacity 70 is made in such a way that the insulating layer 2 as a gate insulating layer is extended from the facing position towards the gate electrode made of a part of the scanning line 3a so as to be a dielectric substance layer, the semiconductor layer 1a is extended so as to be the first accumulating capacity electrode 1f, and furthermore a part of the capacity line 3a facing towards the accumulating capacity electrode 1f is made to be a second accumulating capacity electrode. More specifically, the high density drain area 1e of the semiconductor layer 1a is extended beneath the data line 6a and the scanning line 3a, also the high density drain area 1e of the semiconductor layer 1a is disposed facing towards the capacity line 3b which is extending along the data line 6a and the scanning line 3a via the insulating layer 2; thus, the first accumulating capacity electrode 1f is made.

Additionally, in the accumulating capacity 70, as understood from FIGS. 2 and 3, the accumulating capacity of the first shading layer 111 increases by disposing the first shading layer 111 as a third accumulating capacity electrode at the opposite side of the capacity line 3b as the second accumulating capacity electrode so as to face towards the first accumulating capacity electrode 1f via the first insulating layer 12. This description is supported by the accumulating capacity 70 shown in the right-hand side of FIG. 3.

Also in the position which corresponds to each pixel switching TFT 30 on the surface of the TFT array substrate 10, the first shading layer 111 made of a metal layer M1 and a barrier layer B1 is provided. Between the first shading layer 111 and the TFT 30, a first insulating layer 12 made of highly insulating glass, silicon oxide layer, silicon nitride layer is provided. Additionally, the first insulating layer 12 is formed on the entire surface of the TFT array substrate 10, and in order to solve the gap of the first shading layer 111 pattern, the surface of the first insulating layer 12 is ground and a flattening-treatment is performed.

Also, as shown in FIGS. 2 and 3, in addition to the first shading layer 111 being provided on the TFT array substrate 10, the first shading layer 111 is connected to the capacity line 3b of the previous or latter stage electrically via the contact hole 13. Accordingly, as compared to the case in which each first shading layer 111 is connected to the capacity line of the latter stage electrically, the gap on the area which is the rest of the area on which the capacity line 3b and the first shading layer 111 are formed to overlap the data line 6a along the edge of the opening section of the pixel area need not be increased. If the gap along the edge of the opening section of the pixel section is small, disclination of the liquid crystal (inferior alignment), generated according to the gap, decreases, and it is possible to open the mouth opening section of the pixel section.

On the other hand, on the facing substrate 20, data line 6a on the TFT array substrate 10, the scanning line 3a, the area facing the area on which the pixel switching TFT 30 is formed, in other words, an area which is the rest of the mouth opening section of each pixel section, the second shading layer 23 is provided. Furthermore, on the facing substrate 20 including the second shading layer 23, a facing electrode 21 (common electrode) is provided on the entire surface thereof. The facing electrode 21 is made of a transparent conductive layer such as an ITO layer or the like as well as the pixel electrode 9a of the TFT array substrate 10. Because of the second shading layer 23, incident light from the side on which the facing substrates 20 are provided does not enter the channel area 1a' of the semiconductor layer 1a of the pixel switching TFT 30, the low density source area 1b, and the low density drain area 1c.

Also, in the case of the present embodiment, inorganic alignment layer 36 formed by oblique evaporation of an inorganic material is provided on the underlayer having the gap section 80 on the surfaces such as the third insulating layer 7 which is an area on which the pixel switching TFT 30 of the TFT array substrate, the data line 6a, and the scanning line 3 a are formed, such as the pixel electrode 9a. More specifically, this gap section 80 is a gap made by a convex section 81 of the pixel electrode 9a formed on the capacity line 3b and a concave section 82 of the pixel electrode 9 near this convex section 81. This inorganic alignment layer 36 comprises a first inorganic oblique evaporation layer 36a and a second inorganic oblique evaporation layer 36b.

The first inorganic oblique evaporation layer 36a is formed in the first oblique evaporation step by fixing TFT array substrate 10 on which the first shading layer 111, the first insulating layer 12, TFT 30, the second insulating layer 4, the third insulating layer 7, and the pixel electrode 9a are formed at a certain angle, by performing the oblique evaporation of inorganic material such as silicon oxide unidirectionally, and by growing the columnar structure of inorganic material disposed on the substrate at a predetermined angle. Additionally, reference symbol $S_A$ in FIGS. 2 and 4 indicates the direction of oblique evaporation of inorganic material in forming the first inorganic oblique evaporation layer 36 in the first oblique evaporation step. This oblique evaporation direction $S_A$ is orthogonal to the scanning line 3a and the capacity line 3b, and it is an upward direction in FIG. 2. Also, the oblique evaporation direction $S_A$ should preferably be that the deposition angle $\theta_1$ made by TFT array substrate 10 is 5 degrees to 10 degrees as shown in FIG. 7.

The first inorganic oblique evaporation layer 36a is formed in area 80b where an area 80a close to the gap section 80 as a shade due to the gap section 80 being excluded. This first inorganic oblique evaporation layer 36a is formed on a small portion of the area 80a close to the gap section 80. This is because that evaporation of inorganic material can hardly be performed if the oblique evaporation of the inorganic material is performed in the above oblique evaporation direction $S_A$, the area 80a close to the gap section 80 such as a ramp area and in proximity thereto on the side along the oblique evaporation direction $S_A$ of the convex section 81 becomes a shade of the gap section 80.

Figure 7:
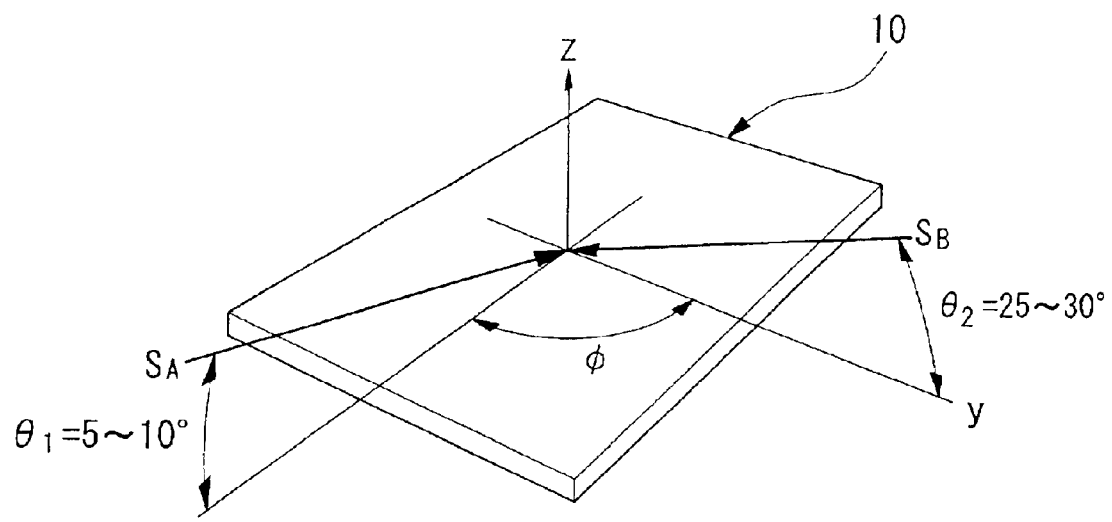
FIG. 7 is a drawing which shows the oblique evaporation direction of the side on which the TFT array substrate is located.

As shown in FIGS. 2 and 7, the second inorganic oblique evaporation layer 36b is formed in a second oblique evaporation step such as by performing the oblique evaporation of inorganic material from a direction $S_B$, which is different from the oblique evaporation direction $S_A$, of the above first oblique evaporation step regarding azimuth angle direction θ along the inside plane direction of the substrate, and by growing the columnar structure disposed in a row at a predetermined angle against the substrate. This oblique evaporation direction $S_B$ is along the scanning line 3a and the capacity line 3b, and the oblique evaporation direction $S_B$ is in a direction from right-to-left on FIG. 2. The azimuth angle direction between the oblique evaporation direction $S_B$ and the oblique evaporation direction $S_A$ should preferably differ by 90 degrees. Also, as shown in FIG. 7, the deposition angle $\theta_2$ made by the, TFT array substrate 10 should preferably be 25 degrees to 30 degrees.

This second inorganic oblique evaporation layer 36b is formed on the area 80a close to above gap section 80 where above first inorganic oblique evaporation layer 36a is not formed. This second inorganic oblique evaporation layer 36b is formed on the area 80a close to above gap section 80 where the first inorganic oblique evaporation layer 36a is not formed. In the second oblique evaporation step shading in the evaporation may occur depending to the shape and the disposition of the gap section 80 of the surface of the underlayer; thus, the second inorganic oblique evaporation layer 36b may not be formed on the entire surface of the first inorganic oblique evaporation layer 36a. That is, it is sufficient if the second inorganic oblique evaporation layer 36b is formed at least on the area 80a close to the gap section 80 and on the first inorganic oblique evaporation layer 36a on both sides of the gap section 80. Accordingly, the inorganic oblique evaporation layer 36 is actually a mixture of areas such as the area where only the first inorganic oblique evaporation layer 36a is formed, the area where the second inorganic oblique evaporation layer 36b is formed on the first inorganic oblique evaporation layer 36a, and the area where only the second inorganic oblique evaporation layer 36b is formed.

Figure 5:
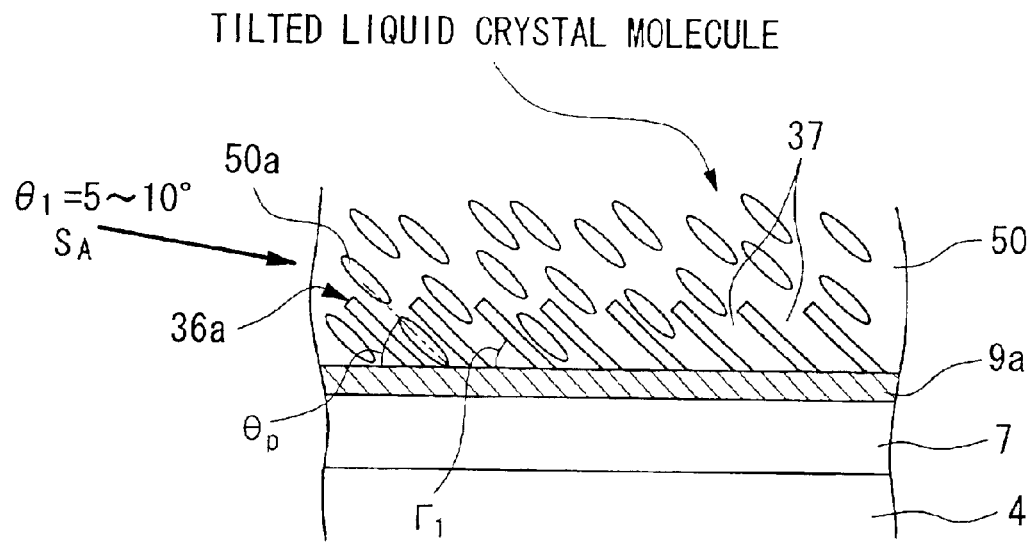
FIG. 5 is a cross section showing the first oblique evaporation layer of a liquid crystal device and an area close along the oblique evaporation direction $S_A$.
Figure 6:
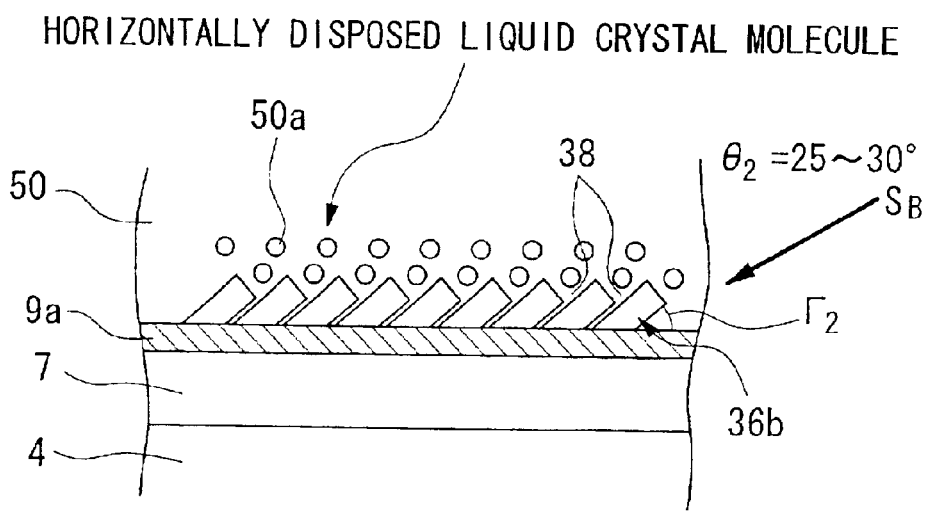
FIG. 6 is a cross section showing the second oblique evaporation layer in an area close to the gap section of the liquid crystal device and an area close along the oblique evaporation direction $S_B$.

FIG. 5 shows the area where only the first inorganic oblique evaporation layer 36a of the liquid crystal device of present embodiment is formed and is a cross section along the oblique evaporation direction $S_A$ close thereto. FIG. 6 shows the area where the first inorganic oblique evaporation layer 36a formed in the area 80a close to the gap section 80 of the liquid crystal device of present embodiment is formed, and a cross section along the oblique evaporation direction $S_B$ close thereto. In addition, the cross section of the area where the second inorganic oblique evaporation layer 36b is formed on the first inorganic oblique evaporation layer 36a is omitted in the drawings. As shown in FIG. 5, the columnar structure of slant inorganic material in the first inorganic oblique evaporation layer 36a is made sparse, and there are spaces 37 between the neighboring columnar structures. On the other hand, in FIG. 6, the columnar structure of slanted inorganic material of the second inorganic oblique evaporation layer 36b is made dense and forms grooves 38 on the surface which is on the side of liquid crystal layer 50. Also, this second inorganic oblique evaporation layer 36b is formed at least on the first inorganic oblique evaporation layer 36a on both sides of the gap section 80, and the structure of such an area is as if the spaces 37 among the columnar structures shown in FIG. 5 were filled with the columnar structure of the second inorganic oblique evaporation layer 36b. Between the direction of inclination of the columnar structures of inorganic material forming the first inorganic oblique evaporation layer 36a and the direction of inclination of the columnar structure of inorganic material forming the second inorganic oblique evaporation layer 36b, at least the azimuth angle direction θ along the inside plane direction of the above substrate is different, and such difference should preferably be 90 degrees.

The thickness of the first inorganic oblique evaporation layer 36a should preferably be 5 nm to 16 nm, and more preferably 8 nm to 10 nm. If the thickness of the first inorganic oblique evaporation layer 36a is less than 5 nm, the pre-tilt angle $θ_p$ is not given to the liquid crystal molecules 50a; thus, such a condition may become a cause of the disclination. If the thickness of the first inorganic oblique evaporation layer 36a is larger than 16 nm, the effect of the second inorganic oblique evaporation layer 36b becomes insufficient; thus, the pre-tilt angle $θ_p$ of the liquid crystal molecules 50a becomes 20 degrees or larger.

Also, the thickness of the second inorganic oblique evaporation layer 36b should preferably be 10 nm to 40 nm. If the thickness of the second inorganic oblique evaporation layer 36b is less than 10 nm, the effect that the columnar structure of the second inorganic oblique evaporation layer 36b fills the spaces 37 of the columnar structure of inorganic material forming the first inorganic oblique evaporation layer 36a decreases; thus, the pre-tilt angle $θ_p$ of the liquid crystal molecules 50a becomes larger than 20 degrees. If the thickness of the second inorganic oblique evaporation layer 36b is larger than 40 nm, the spaces 37 of the columnar structure of inorganic material forming the first inorganic oblique evaporation layer 36a is filled; thus, the pre-tilt angle is not given to the crystal molecules 50a, and the alignment condition is such that there is no pre-tilt angle. Because of this, the average thickness of the inorganic alignment layer 36 is 16 nm to 22 nm or the like.

On the other hand, inorganic alignment layer 42 having a similar form to that of the TFT array substrate 10 is provided also on the facing electrodes 21 of the facing substrates 20 in a position facing towards the inorganic alignment layer 36 on the side on which the TFT array substrate is provided. This inorganic alignment layer 42 is formed by twice performing the oblique evaporation such as fixing the facing substrates 20 on which the second shading layer 23 and the facing electrodes 21 are formed at a certain angle, performing evaporation of inorganic material such as silicon oxide unidirectionally, and performing the second oblique evaporation from a different direction so as to grow the columnar structure, of which the alignment direction is different, on the substrate.

Figure 8:
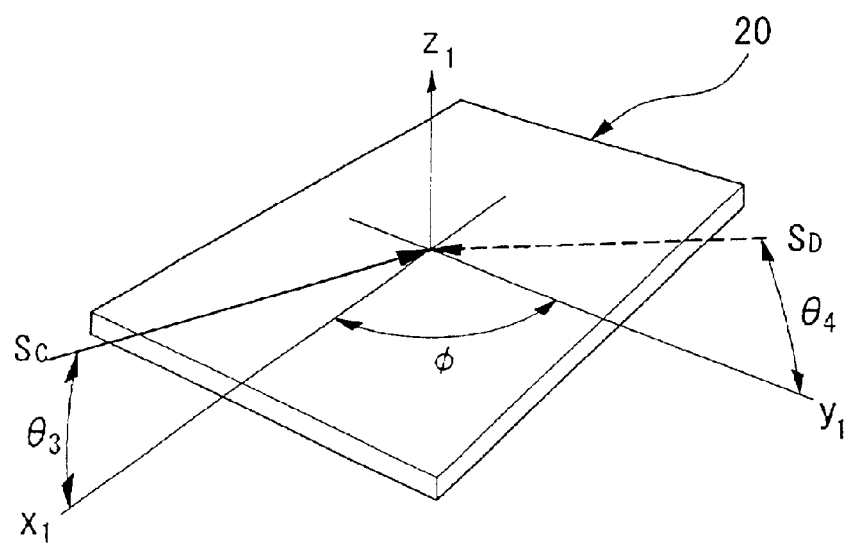
FIG. 8 is a drawing showing the oblique evaporation direction of the side on which facing substrates are formed.

In FIGS. 2 and 4, reference symbols $S_C$ and $S_D$ are oblique evaporation directions of inorganic material when forming the inorganic alignment layer 42 of the side on which the facing substrates 20 are formed. Regarding these oblique evaporation directions $S_C$ and $S_D$, as shown in FIG. 8, angle $θ_3$ made between the facing substrate 20 is 5 degrees to 10 degrees, and the angle $θ_4$ made between the facing substrate 20 is 25 degrees to 30 degrees. The height of the gap section on the surface of the facing substrate 20 is small as compared to the case of the TFT array substrate 10; thus, a shade made by the gap section when operating the oblique evaporation of inorganic material was not occur, and defective evaporation areas are not produced. Therefore, from this point of view, the oblique evaporation of inorganic material need not be performed twice as compared to the case of inorganic alignment layer 36 of the TFT array substrate. However, in this embodiment, in order to set the pre-tilt angle within 5 degrees to 20 degrees, the oblique evaporation is performed twice on the facing substrate 20 so as to form the inorganic alignment layer 42. In the TFT array substrate and the facing substrate 20, pixel electrode 9a is disposed so as to face towards the facing electrodes 21. Consequently, in the space surrounded by these substrates 10 and 20 and a shielding material 51 to be described later (refer to FIGS. 13 and 14), liquid crystals in which dielectric anisotropy is positive is enclosed; thus, the liquid crystal layer 50 is formed. The alignment of the liquid crystal layer 50 enters a predetermined condition by the operation of inorganic alignment layers 36 and 42 under conditions in which electric field is not impressed from the pixel electrode 9a (no-voltage-impression condition). Additionally, in this specification, "voltage-impression-condition" means that the voltage impressed on the liquid crystal layer is the threshold voltage value of the liquid crystal or less, and "no-voltage-impression condition" means that the voltage impressed to the liquid crystal layer is the threshold voltage value of the liquid crystal or more.

The major axis of the liquid crystal molecules 50a close to the area where the first inorganic oblique evaporation layer 36a is formed is aligned towards the surface including the direction along the oblique evaporation direction $S_A$, when an electric field is not impressed (no-voltage-impression condition) as shown in FIG. 5, pre-tilt angle $θ_p$ is 25 degrees to 45 degrees. Such alignment of liquid crystal molecules 50a is caused because of the first inorganic oblique evaporation layer 36a having spaces 37 in the slanted columnar structure, as previously mentioned, and because of the surface shape effect of the liquid crystal layer 50 of the first inorganic oblique evaporation layer 36a.

The major axis of the liquid crystal molecules 50a in the area close to the gap section 80 where the second inorganic oblique evaporation layer 36b is formed is aligned towards the surface including the direction along the oblique evaporation direction $S_B$ under the no-voltage-impression condition as shown in FIG. 6, and the alignment is parallel such as the pre-tilt angle $θ_P$ with almost 0 degree. Such alignment of liquid crystal molecule 50a is caused because the construction of the second inorganic oblique evaporation layer 36b is such that the groove structure 38 obtained by the dense formation of the columnar structure of slanted inorganic material is formed on the surface on which the liquid crystal layer 50 is formed, as previously described, and also because the liquid crystal layer 50 of the second inorganic oblique evaporation layer 36b has the surface shape effect. Also, the liquid crystal molecules 50a close to the area where the second inorganic oblique evaporation layer 36b is formed on the first inorganic oblique evaporation layer 36a (at least the section on both sides of the gap section 80) has a pre-tilt angle between the pre-tilt of the liquid crystal molecules 50a near the first inorganic oblique evaporation layer 36a and the pre-tilt of the liquid crystal molecules 50a near the second inorganic oblique evaporation layer 36b. The pre-tilt angle of the liquid crystal molecule 50a depends on the ratio of the thickness of the first inorganic oblique evaporation layer 36a and the second inorganic oblique evaporation layer 36b. Such alignment of liquid crystal molecules 50a occurs because the construction of the area where the second inorganic oblique evaporation layer 36b is formed on the first inorganic oblique evaporation layer 36a is such that the spaces 37 between the columnar structures shown in FIG. 5 are filled with the columnar structures of the second inorganic oblique evaporation layer 36b, and also because the liquid crystal layer 50 with such a structure has the surface shape effect.

According to above construction of the alignment layer, the average pre-tilt angle $\theta_P$ of the liquid crystal molecule 50a of the liquid crystal layer 50 of present embodiment is set between 5 degrees to 20 degrees. The average pre-tilt angle $\theta_P$ of the liquid crystal molecules 50a can actually be controlled by adjusting factors such as the ratio of thickness of the first inorganic oblique evaporation layer 36a and the second inorganic oblique evaporation layer 36b, and the oblique evaporation angles $\theta_P$ and $\theta_2$. Additionally, under conditions in which $\phi$ is the twist angle of the liquid crystal molecule of the liquid crystal layer 50, and d is the cell gap, the helical pitch P of the liquid crystal material to be used for liquid crystal layer 50 is set to satisfy the Relationship such that $(0.6/360)\phi < d/P < (1.4/360)\phi.$  RELATIONSHIP R1

More specifically, in the case of the present embodiment, the TN mode is used for the display method on the ordinary base as an active matrix type liquid crystal device, and the twist angle $\phi$ of the liquid crystal layer 50 is 90 degrees. Regarding the alignment direction of inorganic alignment layers 36 and 42 of each substrate, on the side of TFT array substrate 10, the liquid crystal molecules are aligned in the direction along the evaporation angle $S_A$ of the first oblique evaporation step as shown in FIG. 5, the liquid crystal molecule is aligned in the direction along the evaporation angle $S_C$, and the twist angle becomes 90 degrees on the facing substrate 20. Therefore, if the cell gap d is 3 μm, the Relationship 1 can be represented as $8.6(\mu m) < P < 20(\mu m).$  RELATIONSHIP R1'

Therefore, the liquid crystal device of the present embodiment can be realized by selecting the material for the liquid crystal in which helical pitch P satisfies the above RELATIONSHIP R1'. The helical pitch P can be controlled by adjusting the amount of chiral complex to be added to the material of the liquid crystal, preferably, among various materials for the liquid crystal.

In the liquid crystal device of the present embodiment, the average pre-tilt angle $\theta_P$ of the liquid crystal molecules 50a of the liquid crystal layer 50 is 5 degrees to 20 degrees. By setting the value of d/P as a ratio between the cell gap d of the liquid crystal device and the helical pitch P of the liquid crystal layer 50 so as to satisfy above relation RELATIONSHIP R1, disclination which was previously caused in the conventional liquid crystal device using the inorganic alignment layer can be prevented effectively. Also, the liquid crystal device can be free from inferior display such as light leakage due to the disclination; thus, a liquid crystal device with good contrast can be realized. Also, inorganic alignment layers 36 and 42 are inorganic oblique evaporation layers; therefore, good light resistance and heat resistance can be obtained as compared to the case of organic layers such as polyimide or the like; thus, such inorganic alignment layers can be preferable for the liquid crystal light valve.

Second Embodiment

A second embodiment of present invention is explained as follows.

The basic construction of the liquid crystal device of present embodiment is the same as the liquid crystal device of the first embodiment. The difference is in the structure of the inorganic alignment layer on each substrate and the material for the liquid crystal. Therefore, in this embodiment, only such different points are explained.

In the first embodiment, the inorganic alignment layer 36 on the TFT array substrate 10 and the inorganic alignment layer 42 on the facing substrate 20 are the columnar structures in which the slanting directions formed in the two oblique evaporations are different. In contrast, in the present embodiment, these inorganic alignment layers 36 and 42 are columnar structures in which the slanting direction formed by one oblique evaporation is aligned in one direction. That is, in FIG. 2 used in the explanation of the first embodiment, on the side of TFT array substrate 10, it may be understood that the direction of the major axis of the liquid crystal molecule is aligned to the direction along the oblique evaporation direction $S_A$ when forming the inorganic alignment layer 36. Also, on the side of the facing substrate 20, it may be understood that the direction of the major axis of the liquid crystal molecule is aligned to the direction along the oblique evaporation direction $S_C$ when forming the inorganic alignment layer 42.

According to the above structure of the alignment layers, in the case of the present embodiment, the average pre-tilt angle $\theta_P$ of the liquid crystal molecules 50a of the liquid crystal layer 50 is set so as to be 20 degrees or larger. The average pre-tilt angle $\theta_P$ of the liquid crystal molecules 50a can actually be controlled by adjusting the oblique evaporation angle. In addition, under conditions that $\phi$ is the twist angle of the liquid crystal molecules of the liquid crystal layer 50 and d is the cell gap, the helical pitch P of the material of the liquid crystals to be used for the liquid crystal layer 50 is set so as to satisfy following relationship RELATIONSHIP 2

$(0.8/360)\phi < d/P < (1.6/360)\phi.$  RELATIONSHIP 2

More specifically, and similarly to the case of the first embodiment, under conditions that the twist angle $\phi$ is 90 degrees and the cell gap d is 3 μm, relationship RELATIONSHIP 2 can be represented such as relationship RELATIONSHIP 2'

$7.5(\mu m) < P < 15(\mu m).$  RELATIONSHIP 2'

Therefore, the liquid crystal device of the present embodiment can be realized by selecting the material for the liquid crystal in which helical pitch P satisfies the above relationship RELATIONSHIP 2'. The helical pitch P can be controlled by adjusting the amount of chiral complex to be added to the material of the liquid crystal, preferably, among various materials for the liquid crystal.

In the liquid crystal device of the present embodiment, the average pre-tilt angle $θ_p$ of the liquid crystal molecules 50a of the liquid crystal layer 50 is 20 degrees or larger. By setting the value of d/P as a ratio between the cell gap d of the liquid crystal device and the helical pitch P of the liquid crystal layer 50 so as to satisfy the above relationship RELATIONSHIP 2, disclination which was caused in the conventional liquid crystal device using the inorganic alignment layer can be prevented effectively. Also the liquid crystal device can be free from inferior display such as light leakage due to the disclination; thus, a liquid crystal device with good contrast can be realized. Thus, similar effects to the case of the first embodiment can be obtained such that a liquid crystal device with good light resistance and heat resistance can be obtained as compared to the case of an organic layer such as polyimide or the like; thus, a liquid crystal device which is advantageous as a liquid crystal light valve can be realized.

In the above embodiment, although the explanation was made for the case in which the present invention is applied to an active matrix type liquid crystal device using a three-terminal type element such as a TFT element, the present invention can also be applied to active matrix type liquid crystal devices using a two-terminal type element such as a TFD element, and to passive matrix type liquid crystal devices. Also, the present invention can be applied to any type of liquid crystal device, regardless of whether it is of the transmission type, reflex type, or semi-transmission reflex type.

For a TFT element, a silicon semiconductor made of polysilicon, or semiconductor layer made of single crystal silicon can be used. In the case of forming a semiconductor layer made of single crystal silicon, a bonding method is used in which a single crystal substrate is bonded to a supporting substrate in an SOI (Silicon on Insulator) and then the single crystal substrate is made to be a thin film, can be used.

Overall Construction of the Liquid Crystal Device

Figure 9:
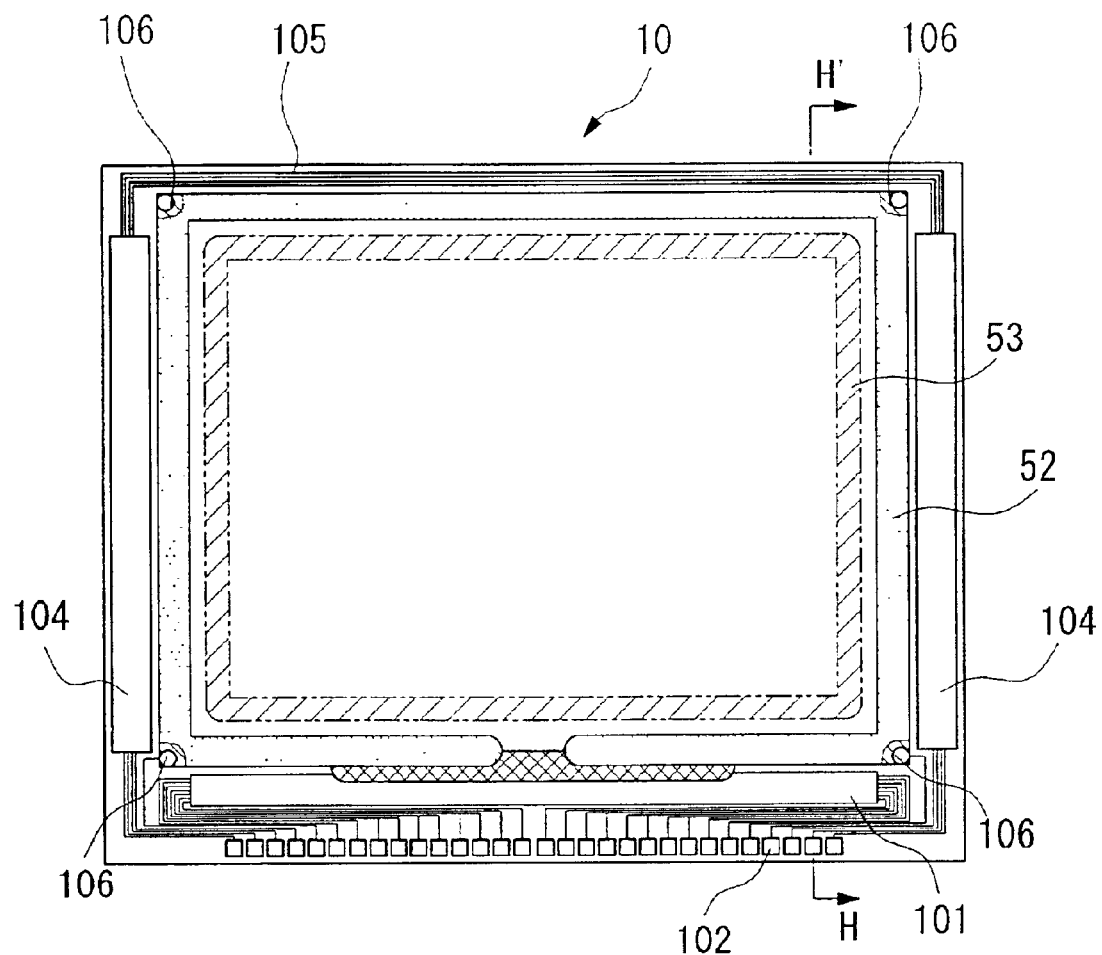
FIG. 9 is a plan view showing a TFT array substrate of a liquid crystal device of the embodiments and the various elements formed on the substrate viewed from the side of the facing substrates.

Next, the overall construction of the liquid crystal device is explained with reference to FIGS. 9 and 10. FIG. 9 is a plan view showing a TFT array substrate 10 and each element formed thereon viewed from the side of the facing substrate 20.

Figure 10:
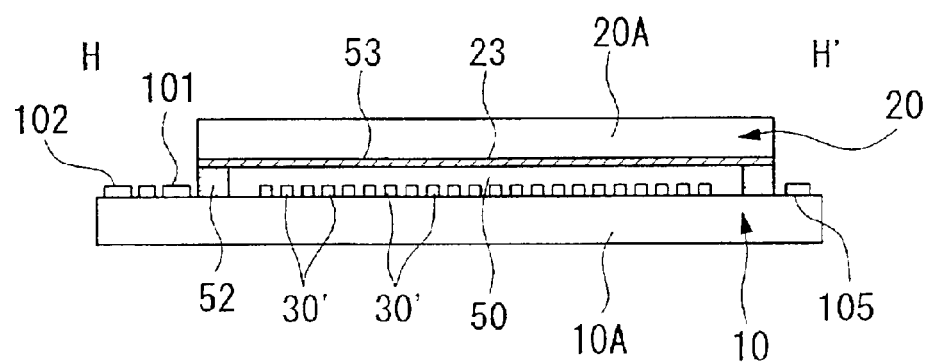
FIG. 10 is a cross section along H–H' line in FIG. 9.

FIG. 10 is a cross section along line H–H' in FIG. 9 and shows the facing substrate 20. In FIGS. 9 and 10, inorganic alignment layers 36 and 42 are omitted.

In FIG. 9, on the TFT array substrate 10, a shielding material 52 is provided along the edge of the TFT array substrate 10, and the third shading layer 53 as a frame, which is made of the same material as the material for the second shading layer 23 or is made of different material from the material for the second shading layer 23, is provided in parallel inside the shielding material 52. In the area outside of the shielding material 51, a data line driving circuit 101 and an external circuit connecting terminal 102 are provided along one member of the TFT array substrate, and scanning line driving circuits 104 are provided along two vertical members of the TFT array substrate contacting one bottom member of the TFT array substrate. Furthermore, on the rest of the members of TFT array substrate 10, a plurality of wirings 105 for connecting the scanning line driving circuits 104 provided on both sides of the picture display area are provided.

Also, at least in one corner section of the facing substrate 20, a conducting member 106 for the purpose of electric conductance between the TFT array substrate 10 and the facing substrate 20 is provided. Consequently, as shown in FIG. 10, the facing substrate 20 having almost the same outline as the bonding member 52 shown in FIG. 9 is fix on the TFT array substrate 10 by the bonding member 52.

On the TFT array substrate 10 of the liquid crystal device in each embodiment as explained above with reference to FIGS. 1 to 10, inspection circuits or the like are disposed for inspecting the quality of the liquid crystal device in the manufacturing process or at the time of shipment. Also, instead of providing the data line driving circuit 101 and the scanning line driving circuit 104 on the TFT array substrate 10, the data line driving circuit 101 and the scanning line driving circuit 104 can be connected electrically and mechanically to the driving LSI mounted on, for example, a TAB (tape automated bonding) substrate via an anisotropic film provided around the TFT array substrate. Also, on the side to which projection light of the facing substrate 20 is incident and on the side from which emitting light is emitted from the TFT array substrate 10, a polarizing light film, phase difference film, polarizing light device and the like are disposed in predetermined directions according to the operation modes such as for example TN (Twisted Nematic) mode, VA (Vertically Aligned) mode, PDLC (Polymer Dispersed Liquid Crystal) mode, also according to modes such as normally-white-mode or normally-black-mode.

The liquid crystal device in the embodiment explained above can be applied to, for example, a color liquid crystal projector (projection display device). In this case, three liquid crystal devices are used as light valves for R, and G, and B, and each color light dispersed via dichroic mirror for dispersing R, and G, and B colors are incident to each light valve respectively as projection light. Accordingly, in each embodiment, a color filter is not provided on the facing substrate 20. However, RGB color filters and a protection layer therefore can be formed on the facing substrate 20 in predetermined areas facing towards a pixel electrode 9a on which the second shading layer is not formed. By doing this, the liquid crystal device in the embodiment can be applied to color liquid crystal devices such as a direct-view type color liquid crystal television and a reflex type color liquid crystal television which are not liquid crystal projectors.

Electronic Device

Figure 11:
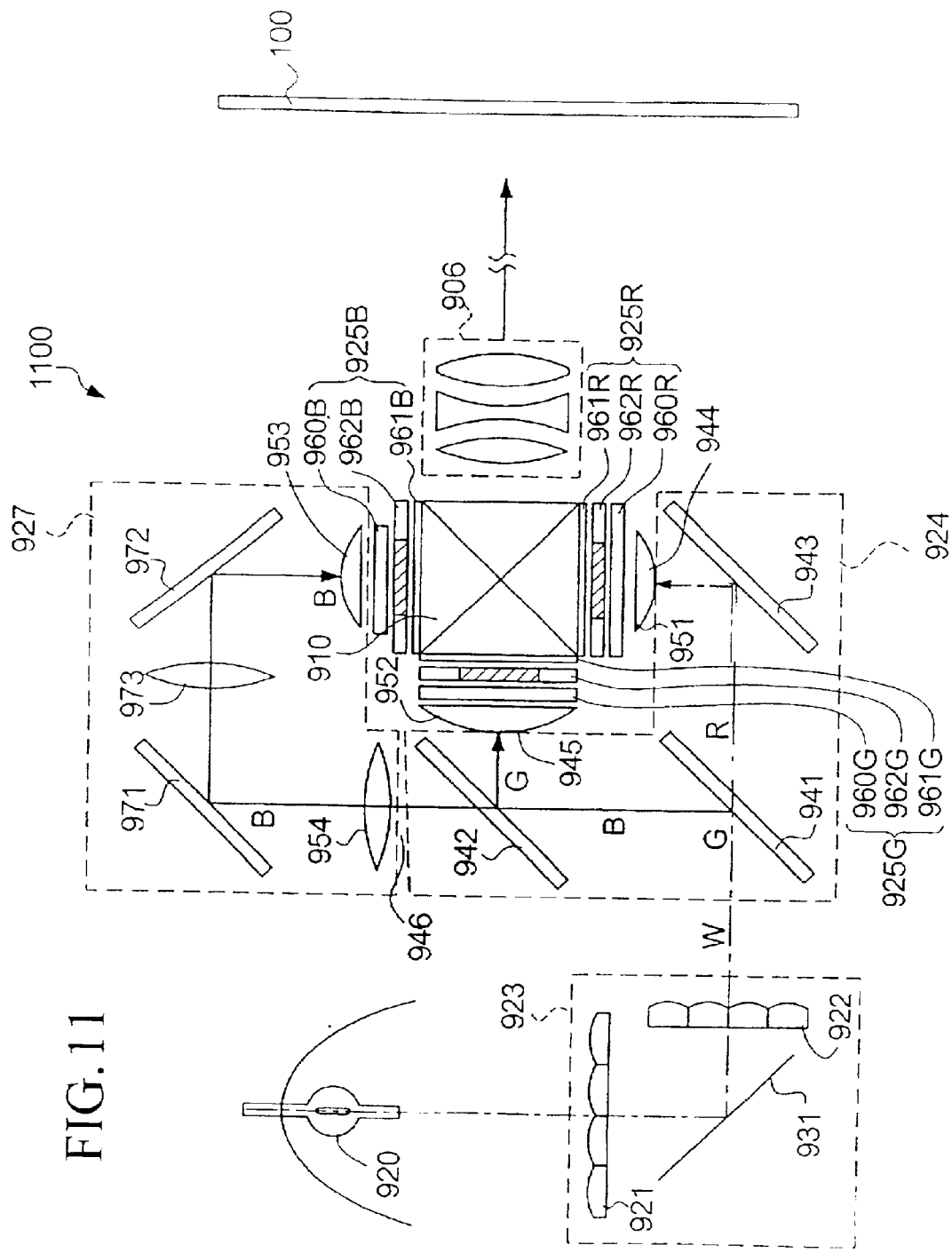
FIG. 11 is a drawing which shows a projection a sample display device of an electronic apparatus which uses a liquid crystal device.

As an example of an electronic device using the liquid crystal device in the embodiment of the present invention, the construction of the projection display device is explained with reference to FIG. 11. In projection display device 1100 in FIG. 11, three liquid crystal devices of the above embodiment are prepared, and the optical system of the projection liquid crystal device is constructed such that each liquid crystal device is used as liquid crystal devices 962R, 962G, and 962B for colors such as R, and G, and B. In the optical system of the projection display device of present invention, a light source device 920, and an uniform lighting optical system 923 are employed. Additionally, the projection display device comprises a light separating optical system 924 as a means for separating the light beam W emitted from this uniform lighting optical system 923 into colors such as red (R), green (G), and blue (B), three light bulbs 925R, 925G, and 925B as a modulating means for modulating each colored light beam such as R, G, and B, a color synthesizing prism 910 as a color synthesizing means for resynthesizing the color light beams after the modulation, a projection lens unit 906 as a projection means for enlarging and projecting the synthesized light beams on a projecting plane 100. Also this projection display device is provided with a light-guiding optical system 927 for guiding the blue color beam B into the light valve 925B.

The uniform lighting optical system 923 is provided with two lens plates 921, 922, and a reflex mirror 931. Two lens plates 921 and 922 are disposed so as to be orthogonal to each other, and the reflex mirror 931 is disposed between lens plates 921 and 922. Two lens plates 921 and 923 of the uniform lighting optical system 923 are provided with a plurality of rectangular lenses disposed in a matrix respectively. The light beam emitted from the light source device 920 is split into a portion of a light beams. These split light beams are superimposed near the three light valves 925R, 925G, and 925B by the rectangular lens of the second lens plate 922. Accordingly, by using the uniform lighting optical system 923, lighting three light valves 925R, 925G, and 925B with uniform light is possible even if the luminous intensity of the light source device 920 is not uniform in the cross section of emitted light beams.

A respective color separating optical system 924 comprises a blue and green reflex dichroic mirror 941, a green reflex dichroic mirror 942, and a reflex mirror 943. First, in the blue and green reflex dichroic mirror 941, a blue light beam B and a green light beam G included in the light beam W are reflected orthogonally, and are sent to a side of the green reflex dichroic mirror 942. The red light beam R passes through this mirror 941, and is reflected orthogonally at the reflex mirror 943 disposed behind the blue and green reflex dichroic mirror 941, and is then emitted to a side of the color synthesizing prism 910 from the emission section 944 of the red color light beam R.

Next, in the green reflex dichroic mirror 942, only the green light beam G among the blue light beam B and the green light beam G reflected at the blue and green reflex dichroic mirror 941 is reflected orthogonally, it is then emitted to a side of a color synthesizing optical system from the emission section 945 of the green light beam G. The blue light beam B which passed the green reflex dichroic mirror 942 is emitted to a side of the light guiding optical system 927 from the emission section 946 of the blue light beam B. In this example, in the color separating optical system, the distance between the emission section of the light beam W of uniform lighting optical element and the emission sections of each color 944, 945, and 946 are set to be nearly equal.

In the emission side of the emission sections 944 and 945 of the red light beam R and green light beam G of the color separating optical system 924, condensing lenses 951 and 952 are disposed respectively. Accordingly, the red light beam R and the green light beam G emitted from each emission section are made to enter these condensing lenses 951 and 952 and are made to be parallel.

The red light beam R and green light beam G which are made parallel are made incident into the light valve 925R and 925G, and are modulated, and then the picture information corresponding to each color light is added. That is, the switching control is performed on these liquid crystal devices according to the picture information by the driving devices (not shown in the drawings). By doing this, the modulation of each color of light passing therethrough is performed. On the other hand, the blue light beam B is guided into the corresponding light valve 925B via the light guiding optical system 927, and the modulation according to the picture information is performed similarly here. In addition, the light valves 925R, 925G, and 925B respectively further comprise an incident side polarizer 960R, 960G, and 960B, an emission side polarizer 961R, 961G, and 961B, and a liquid crystal device 962R, 962G, and 962B which are disposed between the above polarizer.

The light guiding optical system 927 comprises a condensing lens 954 disposed in emission side of the emission section 946 of the blue light beam B, an incident side reflex mirror 971, an emission side reflex mirror 972, an intermediate lens 973 disposed between these reflex mirrors, and a condensing lens 953 disposed ahead of the light valve 925B. The blue light beam B emitted from the condensing lens 954 is guided to the liquid crystal device 962B via the light guiding optical system 927 and is then modulated. Regarding the length of the light path of each color light beam, in other words, regarding the distance between the emission section of the light beam W and each liquid crystal device 962R, 962G, and 962B, the optical path of the blue light beam B is the longest. Therefore, the blue light beam B loses the most light. However by the intervention of the light guiding optical system 927, the loss of the light can be restricted.

Each color light beam R, G, and B which passes through each light valve 925R, 925G, and 925B and is modulated is incident on the color synthesizing prism 910, and is combined there. The light synthesized by the color synthesizing prism 910 is magnified and projected on the surface of the projection plane 100 disposed in the predetermined position via the emission lens unit 906.

The liquid crystal devices 962R, 962G, and 962B of this example are explained with reference to FIGS. 1 to 10. By using the liquid crystal device of the above embodiment, a liquid crystal device, with no inferior quality display and inferior contrast, which is a high quality projection display device, can be realized.

Construction of the Liquid Crystal Device of the Third Embodiment

The construction of the liquid crystal device of the third embodiment is the same as the construction of the liquid crystal device of the first embodiment; therefore, duplicated explanations are omitted.

As shown in FIG. 3, the first shading layer 111 is provided in the position corresponding to the pixel switching TFT 30 on the surface of the TFT array substrate 10. The first shading layer 111 comprises a metal layer M1 provided on the TFT array substrate 10 and a barrier layer B1 provided on the metal layer M1.

The barrier layer B1 is made of a metal or metal compound which does not include Oxygen atoms therein and the melting point of the metal or metal compound is high. More specifically, the barrier layer B1 is made of any of nitride compound, silicon compound, tungsten compound, tungsten, and silicon.

Also, the metal layer M1 is made of a metal or metal compound which has light blocking tendency and high melting point. The metal layer M1 is made of metal or metal compound of which light shading tendency deteriorates if the metal layer M1 becomes an oxide compound by the chemical reaction with the insulating layer made of $SiO_2$.

Also, between the first shading layer 111 and a plurality of pixel switching TFT 30, the first insulating layer 12 is provided. The first insulating layer 12 is provided for the purpose of insulating the semiconductor layer 1a forming the pixel switching TFT 30 from the first shading layer 111 electrically. Furthermore, the first insulating layer 12 is formed on the entire surface of the TFT array substrate 10, and the surface of the first insulating layer 12 is ground so as to nullify the gap of the pattern of the first shading layer 111, and a flattening treatment is performed on the surface of the first insulating layer 12.

The first insulating layer 12 is made of, for example, highly insulating glass, a silicon oxide layer, silicon nitride layer and the like. By this first insulating layer 12, the situation in which the first shading layer 111 contaminates the pixel switching TFT 30 can be prevented as a precaution.

In the present embodiment, the accumulating capacity 70 is made such that a gate insulating layer 2 is extended from the position facing towards the scanning line 3a and the gate insulating layer 2 is used as a dielectric substance, the semiconductor layer 1a is extended to be made as the first accumulating capacity electrode if, and a part of the capacity line 3b facing towards the above gate insulating layer 2 and the semiconductor layer 1a is made to be the second accumulating capacity electrode.

More specifically, the highly dense drain area 1e of the semiconductor layer 1a is extended beneath the data line 6a and the scanning line 3a, and the highly dense drain area 1e of the semiconductor layer 1a is disposed so as to face towards the capacity line 3b extending along the data line 6a and the scanning line 3a via the insulating layer 2; then, the highly dense drain area 1e of the semiconductor layer 1a is made to be the first accumulating capacity electrode (semiconductor layer) 1f. In particular, the insulating layer 2 as a dielectric substance of the accumulating capacity 70 is the gate insulating layer 2 of TFT 30 formed on the single crystal layer by oxidation at high temperature. Therefore, the insulating layer 2 can be made to be thin and an anti-high-voltage insulating layer, and the capacity of the accumulating capacity 70 can be large in a relatively small area.

In addition, as can be understood from FIGS. 2 and 3, the construction of the accumulating capacity 70 is made such that the first shading layer 111 as the third accumulating capacity electrode is disposed so as to face towards the first accumulating capacity electrode 1f via the first insulating layer 12 in the opposite side of the capacity line 3b as the second accumulating capacity electrode (to be referred to as the accumulating capacity 70 in the right-hand side of FIG. 3); thus, the accumulating capacity is increased. That is, the construction of the present embodiment is a double accumulating capacity construction in which the accumulating capacity is provided on both sides of the first accumulating capacity electrode 1f; thus, the accumulating capacity increases.

Above first shading layer 111 (and the capacity line 3b which is connected to the first shading layer 111 electrically) is connected to a constant power supply electrically, and the electric potential of the first shading layer 111 and the capacity line 3b are constant. Accordingly, the fluctuation of the electric potential of the first shading layer 111 does not adversely inferior influence the pixel switching TFT 30 which is disposed so as to face towards the first shading layer 111. Also, the capacity line 3b can function properly as the second accumulating capacity electrode of the accumulating capacity 70. In this case, for the constant power supply, a negative power supply supplied to peripheral circuits such as scanning line driving circuits and data line driving circuits for driving the liquid crystal device, a constant power supply such as positive power supply, a grounding power supply, and a constant power supply which is supplied to the facing electrode 21 can be mentioned. By using the power supply of the peripheral circuit in this way, it is possible to make the electric potential of the first shading layer 111 and the capacity line 3b constant without providing exclusive electric potential wirings and auxiliary input terminals.

Also, on the first shading layer 111, a contact hole 13 is opened on the projecting section which projects from the main line section extending almost linearly as explained above. Here, in the opening area of the contact hole 13, it is known that less cracking is generated in areas closer to the edge due to reasons such as the dissipation of stress from the edge.

Also, as above explained, the first shading layer 111 is provided beneath the pixel switching TFT 30; thus, the incidence of returning light at least into a channel area 1a' of the semiconductor layer 1a and into LDD areas 1b and 1c can be prevented effectively.

In addition, in this embodiment, the capacity line 3b provided in the neighboring pixel of the previous stage or in the neighboring pixel of latter stages is connected to the first shading layer 111; therefore, the capacity line 3b for the pixel on the highest stage or on the lowest stage for supplying constant electric potential to the first shading layer 111 is necessary. For that case, an extra piece of capacity line 3b for the vertical pixel should preferably be provided.

The second shading layer 23 has a function of, for example black matrix for the purpose of improving the contrast and preventing the mixing of colors.

The thickness of inorganic alignment layer 42 is 5 nm to 16 nm.

The average pre-tilt angle $\theta_P$ of the liquid crystal molecules 50a of the liquid crystal layer 50 should preferably be 5 degrees to 15 degrees, and more preferably 12 degrees to 14 degrees. The average pre-tilt angle $\theta_P$ of the liquid crystal molecules 50a can be adjusted by controlling factors such as the ratio of the thickness of the first inorganic oblique evaporation layer 36a and the second inorganic oblique evaporation layer 36b, and such as oblique evaporation angle $\theta_1$ and $\theta_2$. The liquid crystal molecules 50a of the liquid crystal layer 50 are made such that the alignment can be changed when a voltage is impressed, and such conditions can be displayed by optically distinguishing the alignment.

The shielding material 52 is a bonding agent made of, for example, light curable resing or heat curable resin. In the shielding material 52, spacers such as glass fibers or glass beads for setting the distance between both substrates at a predetermined value is mixed.

In the liquid crystal device of the present embodiment, inorganic alignment layer 36 formed on the underlayer having the gap section 80 comprises the first inorganic oblique evaporation layer 36a made of the columnar structure of slanted inorganic material, the second inorganic oblique evaporation layer 36b in which the slanting direction of the columnar structure of the inorganic material of the second inorganic oblique evaporation layer 36b is different from the slanting direction of the columnar structure of the inorganic material of the first inorganic oblique evaporation layer 36a in view of azimuth angle direction. In addition, the second inorganic oblique evaporation layer 36b is formed in the area 80a close to the gap section 80; thus, unevenness of the evaporation of inorganic materials in the area 80a close to the gap section 80 and the occurrence of defective evaporation areas can be reduced. Accordingly, even if the pixel pitch becomes 20 μm or less, there can be no defect in the inorganic alignment layer formed on the underlayer having the gap section on the surface of the underlayer, inferior alignment of liquid crystals due to abnormalities of the alignment layer can be prevented, the occurrence of inferior quality display such as lowered contrast can be prevented. Such effects can also be obtained even if the pixel pitch becomes as fine as 15 μm or less.

Also, inorganic alignment layers 36 and 42 are made of inorganic oblique evaporation layers; thus, light resistance and heat resistance are better than the alignment layer made of an organic material such as polyimide, and a more durable liquid crystal device can be obtained.

Regarding the construction of the liquid crystal device of the third embodiment, the pixel electrode 9a and the high density drain area 1e can be connected electrically by way of an aluminum layer which is the same as the data line 6a and by way of polysilicon layer which is the same as the scanning line 3b.

Although the pixel switching TFT 30 should preferably be made in LDD construction, off-set construction in which contaminating ions are not shot into the low density source area 1b and the low density drain area 1c is possible, and also the TFT can be of a self-aligning type in which contaminating ions are shot in high density by using the gate electrode as a mask so as to form the high density source area and the high density drain area in a self-aligning manner.

Also, although in present embodiment the construction of the gate electrode made of a part of the scanning line 3a of the pixel switching TFT 30 is a single-gate construction in which only one gate electrode is disposed in the source drain area, the disposition of more than two gate electrodes therein is possible. In this case, the same signal should be impressed on each gate electrode. By making the TFT a dual gate, a triple gate, or more, leak current at the connection point of the channel and the source drain area can be prevented, and the flowing of the electric current while the power is turned off can be reduced. At least one gate electrode can be in an LDD construction of an off-set construction.

Also, the semiconductor layer is not limited to be made of polysilicon, and single crystal silicon can also be used. For single crystal silicon, an SOI (Silicon on Insulator) construction in which a thin layer single crystal layer is formed on the insulating layer is preferable.

In particular, the insulating layer 2 as a dielectric substance of the accumulating capacity 70 can be thin and resistant to high voltages if the insulating layer 2 is a gate insulating layer of the pixel switching TFT 30 formed on the polysilicon layer by the oxidation in high temperature, and the capacity of the accumulating capacity 70 can be large in a relatively small area.

Manufacturing Process of Liquid Crystal Device of Third Embodiment

Figure 12:
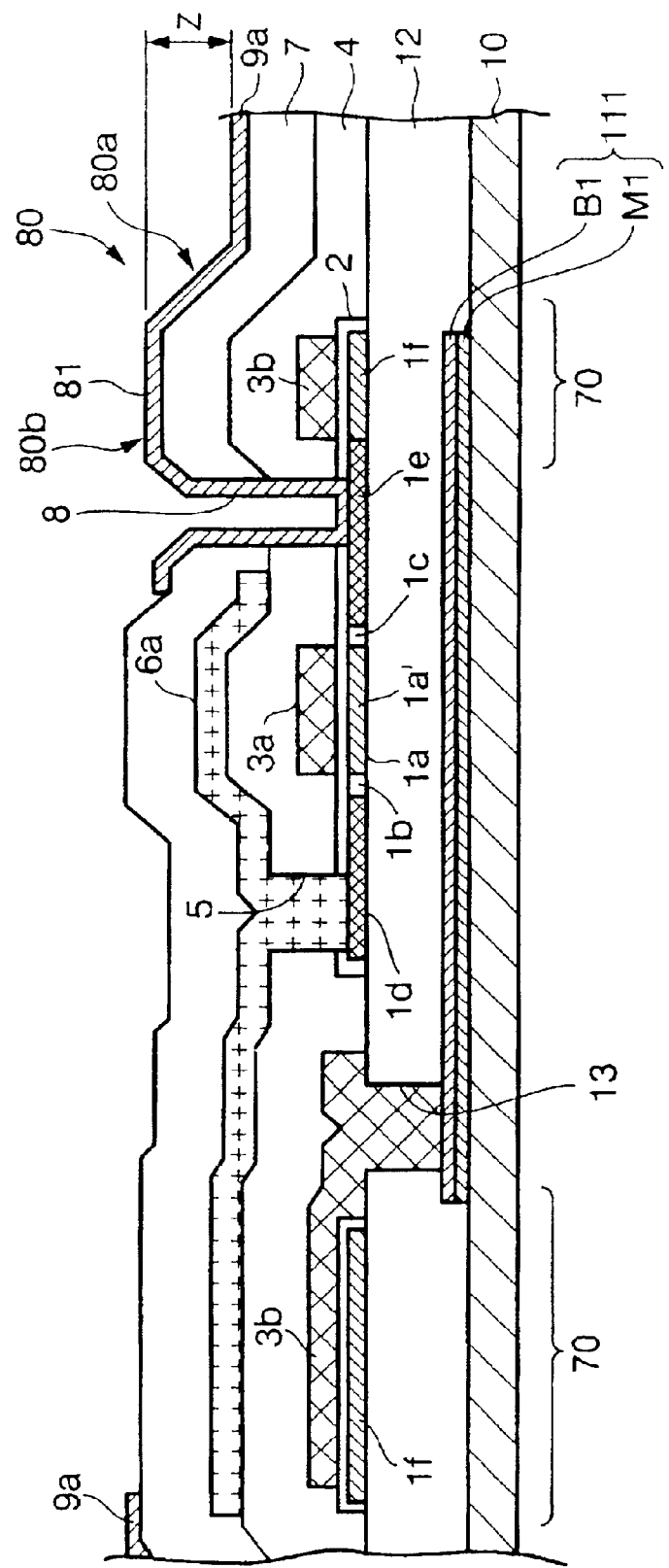
FIGS. 12 to 15 show manufacturing processes for the liquid crystal device according to each step of a manufacturing method.
Figure 13:
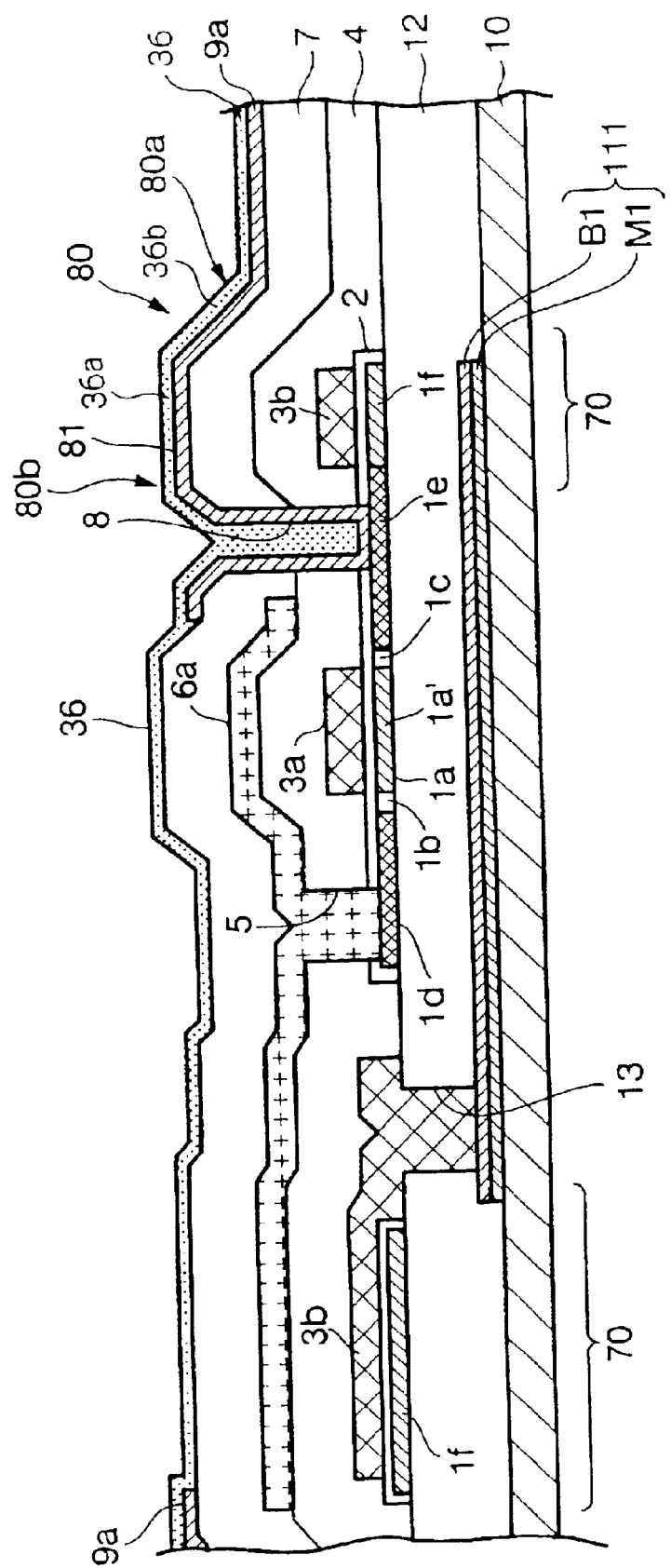
Figure 14:
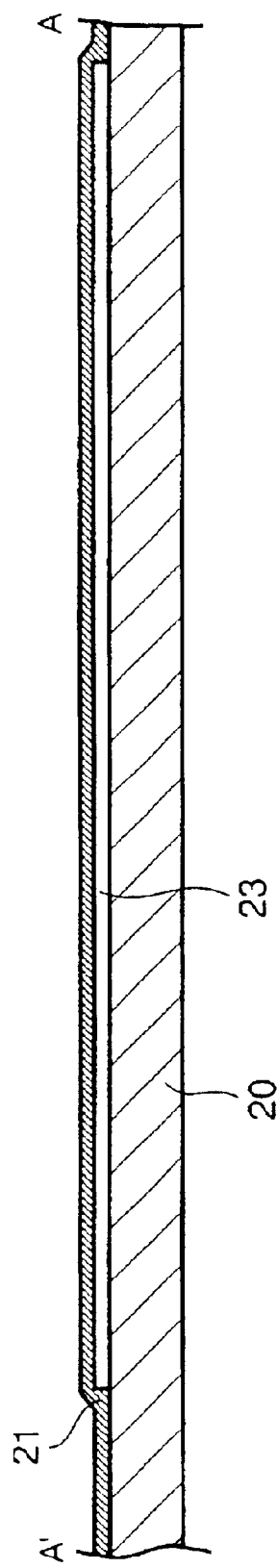
Figure 15:
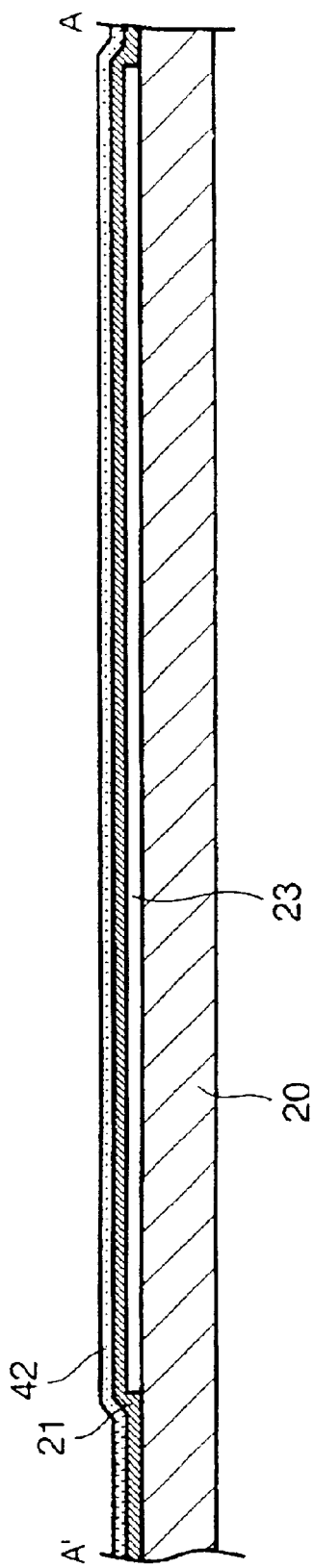
Figure 16:
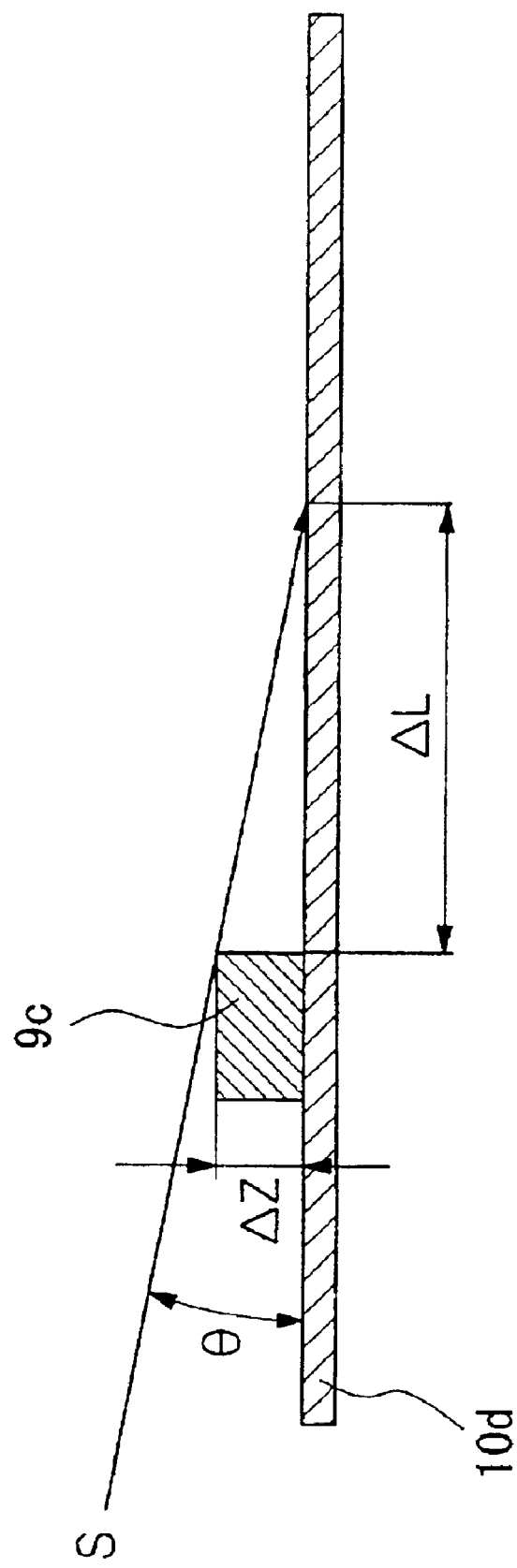
FIG. 16 is a view for examining the Relationship among θ as an evaporation angle of silicon oxide, ΔZ as a height of the gap, and ΔL as a width of the non-alignment-layer area where an inorganic oblique evaporation layer is not formed.
Figure 17:
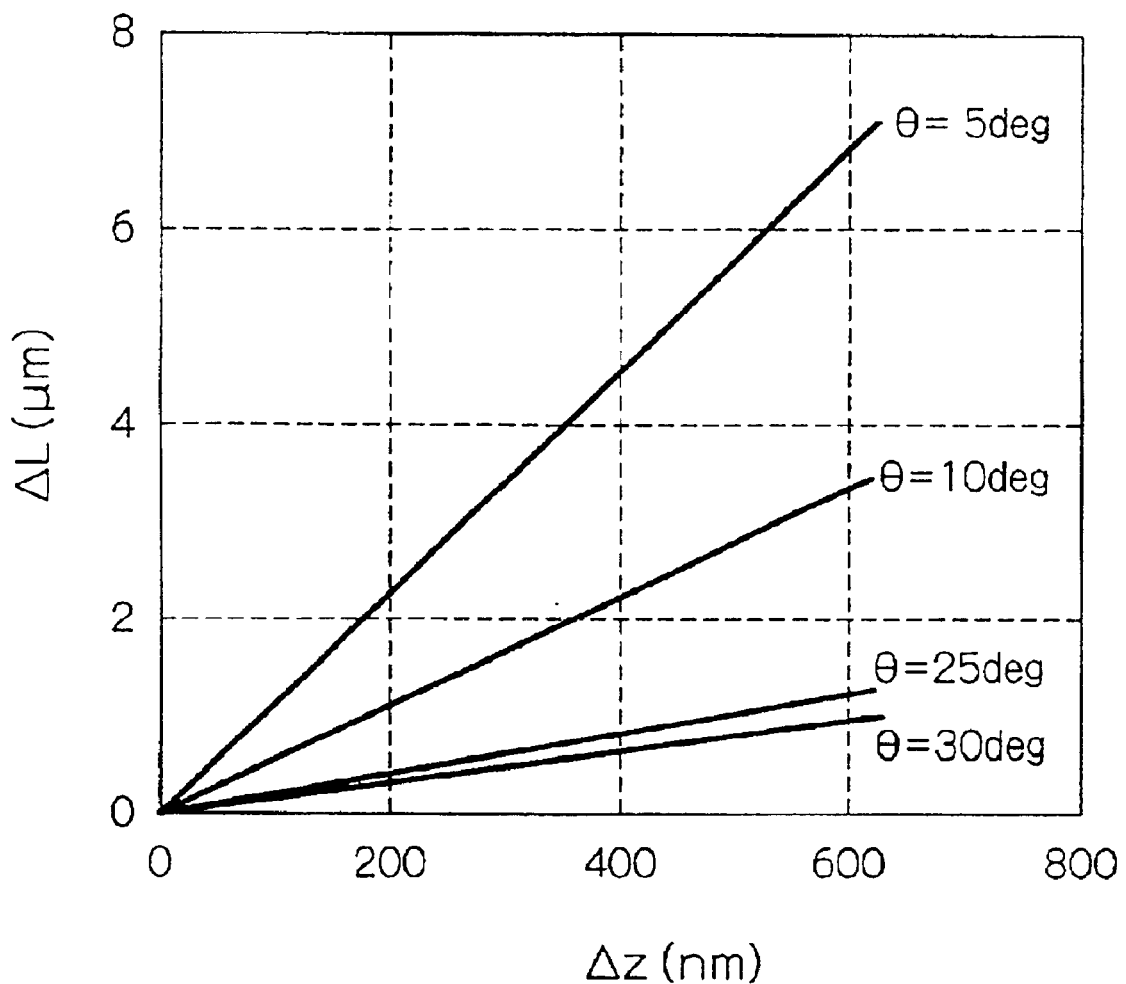
FIG. 17 is a view showing the Relationship among θ as an evaporation angle of silicon oxide, ΔZ as a height of the gap, and ΔL as a width of a non-alignment-layer area where an inorganic oblique evaporation layer is not formed.
Figure 18:
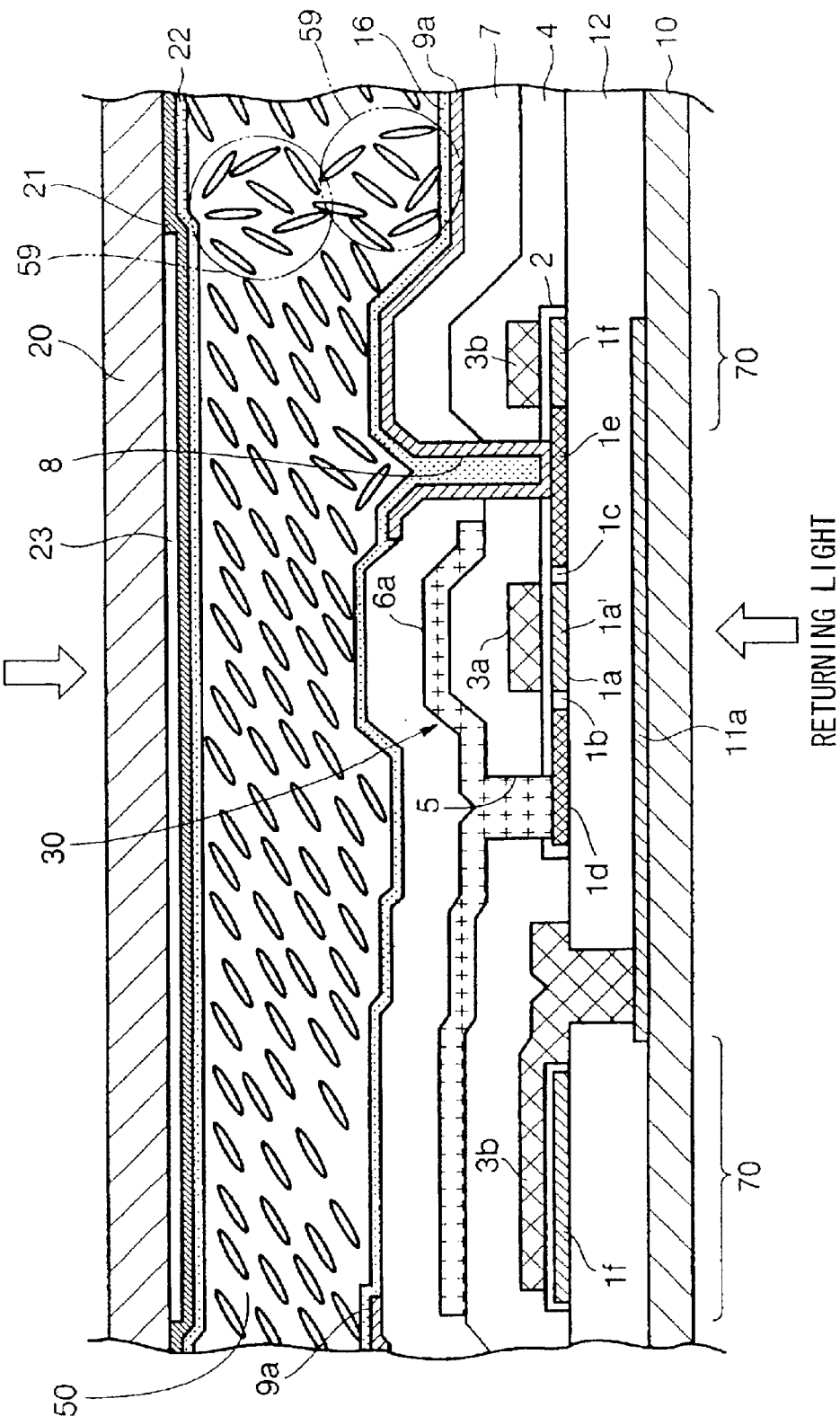
FIG. 18 is a cross section showing an example of a conventional liquid crystal device.
Figure 19:
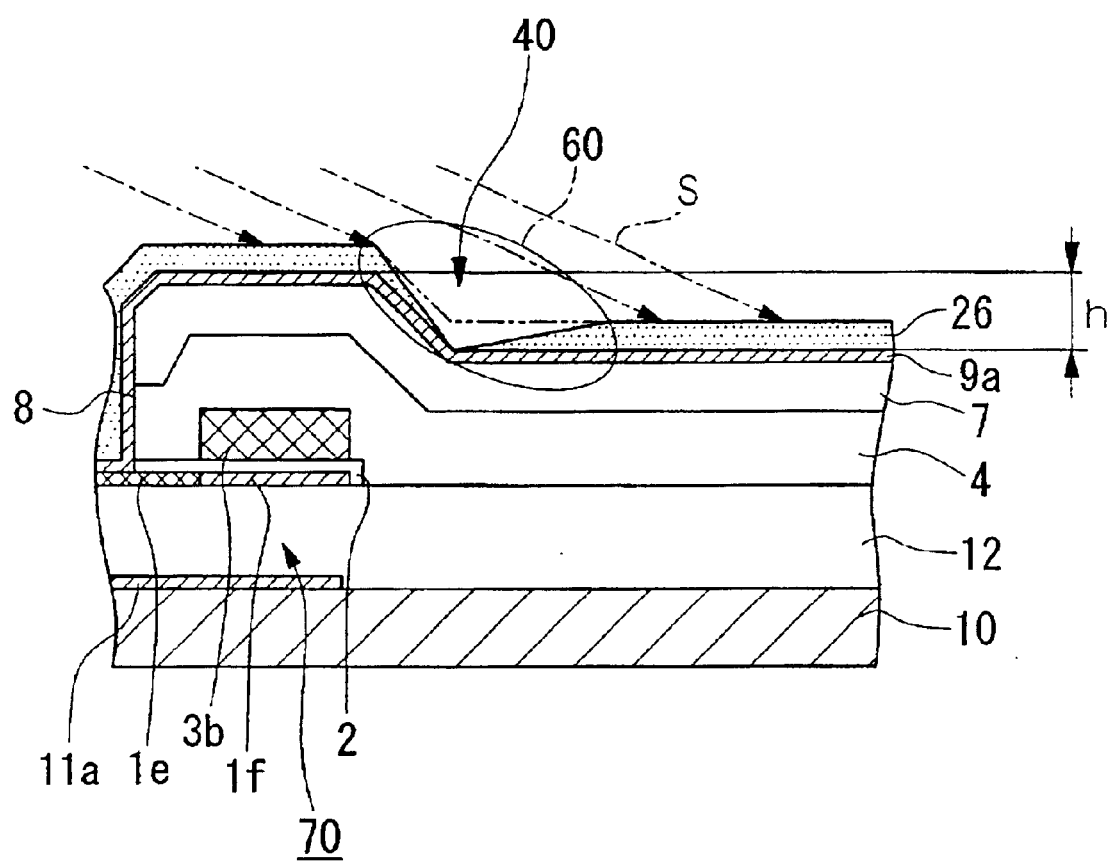
FIG. 19 is a view showing an area close to the gap section of the substrate for the conventional liquid crystal device on which an alignment layer made of inorganic slant vacuum evaporated layer is formed.

Next, a manufacturing process for a liquid crystal device of the third embodiment is explained with reference to FIGS. 7, 8, and 12 to 15. FIGS. 12 and 13 show each layer of TFT array substrate 10 in each step, and FIGS. 14 and 15 are step diagrams and show each layer of the facing substrate 20 in each step similarly to the FIG. 3 in correspondence to the cross section taken along the line A–A' in FIG. 2.

As shown in FIG. 12, on the TFT array substrate 10 made of a quartz substrate and hard glass, the first shading layer 111 made of metal layer M1 and barrier layer B1, the first insulating layer 12, contact hole 13, semiconductor layer 1a, channel area 1a', low density source area 1b, low density drain area 1c, high density source area 1d, high density drain area 1e, the first accumulating capacity electrode 1f, insulating layer 2, scanning line 3a, capacity line 3b, the second insulating layer 4, data line 6a, the third insulating layer 7, contact hole 8, and pixel electrode 9a are formed for the a preparation.

The gap section 80 is formed on the surface of the TFT array substrate (the surface of the underlayer of the inorganic alignment layer 36 to be mentioned later) on which the pixel electrode 9a and the like are formed.

Next, as shown in FIG. 7, the first oblique evaporation step is performed in which the first inorganic oblique evaporation layer 36a is formed in order that the thickness of the first inorganic oblique evaporation layer 36a be 5 nm to 16 nm by performing the oblique evaporation of inorganic material unidirectionally on the surface of the TFT array substrate 10 having the gap section 80 on the surface of the TFT array substrate as shown in FIG. 5. In this first inorganic oblique evaporation step, the first inorganic oblique evaporation layer 36a is not formed in the shadow of the evaporation, that is, in the area 80a close to the gap section 80. This first inorganic oblique evaporation layer 36a is formed in the area 80b which excludes the area 80a close to the gap section 80.

FIG. 7 shows the TFT array substrate 10 on which pixel electrode 9a and the like are formed viewed from the upward direction (from the surface side of the underlayer of the alignment layer), pixel electrode 9a, contact hole 8, and the third insulating layer 7 are omitted in the drawing. This oblique evaporation direction $S_A$ is orthogonal to the direction of the scanning line 3a and the capacity line 3b, and the oblique evaporation direction $S_A$ is directed from below to above in FIG. 2. Such disposition of the oblique evaporation direction $S_A$ is in order to reduce the area in which the inorganic oblique evaporation layer is not made due to the shadow made by the gap section 80 when performing the oblique evaporation in the direction from the bottom to the top of the plan view in FIG. 2, the gap of the gap section of the surface of the underlayer near the line B–B' is larger than the gap of the gap section on the surface of the underlayer near the line C–C' in FIG. 2.

Also, the oblique evaporation direction $S_A$ should preferably be disposed in such a way that the evaporation angle $\theta_1$ made by the TFT array substrate 10 is 5 degrees to 10 degrees as shown in FIG. 7. If the evaporation angle $\theta_1$ of the inorganic material in the first oblique evaporation step is less than 5 degrees, the density of the columnar structures to be formed becomes too low; thus, the alignment condition of the liquid crystal molecules 50a becomes unstable, and the alignment direction becomes very uneven inside the plane along the inside plane direction of the substrate. If the evaporation angle $\theta_1$ is larger than 10 degrees, the density of the columnar structures to be formed becomes too high; thus, the effect that the spaces 37 between the columnar structures of the first inorganic oblique evaporation layer 36a are filled with the columnar structures of the second inorganic oblique evaporation layer 36b can hardly be obtained. As a result, if the liquid crystal device is manufactured by using this substrate, the area in which there is no pre-tilt in the alignment of the liquid crystal molecules becomes large.

Next, as shown in FIG. 7, the second oblique evaporation step is performed in such a way that the oblique evaporation of inorganic material is performed such that at least the oblique evaporation direction $S_A$ of inorganic material in the first oblique evaporation step is different from the oblique evaporation direction $S_B$ with regard to the azimuth angle direction φ along the inside plane direction of the substrate, and in such a way that the second inorganic oblique evaporation layer 36b is formed such that the thickness of the second inorganic oblique evaporation layer 36b is 10 μm to 40 μm in the area 80a close to the gap section 80 where the first inorganic oblique evaporation layer 36a is not formed thereon, and on the first inorganic oblique evaporation layer 36a as shown in FIG. 6.

This oblique evaporation direction $S_B$ is along the direction of scanning line 3a and the capacity line 3b, and is also a direction from the right-hand side to the left-hand side in the plan view in FIG. 2. By the disposition that the azimuth angle direction φ between the oblique evaporation direction $S_A$ and the azimuth angle direction of the oblique evaporation direction $S_B$ is different, the first inorganic oblique evaporation layer 36a can be formed favorably in the area 80b where the area 80a close to the gap section 80 is excluded, and also the second inorganic oblique evaporation layer 36b can be formed favorably in the area 80a close to the gap section 80a where the first inorganic oblique evaporation layer 36a is not formed and on the first inorganic oblique evaporation layer 36a.

Also, in the oblique evaporation direction $S_B$, the evaporation angle $\theta_2$ made by the TFT array substrate 10 should preferably be 25 degrees to 30 degrees as shown in FIG. 7.

If the evaporation angle $\theta_2$ of the oblique evaporation direction $S_B$ in the second oblique evaporation step is less than 25 degrees, the effect that the space 37 in the columnar structure of the first inorganic oblique evaporation layer 36a is filled with the columnar structure of the second inorganic oblique evaporation layer 36b can hardly be obtained. If the evaporation angle $\theta_2$ is larger than 30 degrees, anisotropy of the surface of the layer to be formed becomes insufficient, and the function for aligning the liquid crystal molecules is lost.

By the first inorganic oblique evaporation step and the second inorganic oblique evaporation step, the TFT array substrate on which the inorganic alignment layer 36 is formed can be obtained as shown in FIG. 13.

On the other hand, the facing substrate 20 is formed in such a way that, the glass substrate or the like is prepared first, the sputtering process using, for example, chrome metal is performed on the second shading layer 23 and on the third shading layer 53 as a frame, to be explained later (with reference to FIGS. 13 and 14), and after that, the photo-lithography step and the etching step are performed. These shading layers can be formed by metallic material such as chrome (Cr), nickel (Ni), and aluminum (Al), and by resin material such as resin black made by spraying carbon and titanium onto photo-resist.

After that, the facing electrode 21 is formed in such a way that the transparent conductive layer made of ITO or the like is layered on the entire surface of the facing substrate 20 with a thickness of 50 to 200 nm by performing the sputtering process as show in FIG. 14.

Next, as shown in FIG. 8, the oblique evaporation is performed by fixing the facing substrate 20 on which the second shading layer 23 and the facing electrode 21 and the like are formed with a certain angle, by performing the evaporation of an inorganic material such as silicon oxide from the direction $S_C$ unidirectionally, and by growing the columnar structures which are aligned with a predetermined angle towards the substrate.

Additionally FIG. 8 shows the facing substrate 20 on which the facing electrode and the like are formed viewed from the top surface side (the surface side of the underlayer of the alignment layer), and the facing electrode 21 is omitted in the drawing.

In FIG. 8, the reference symbol $S_C$ is a oblique evaporation direction for inorganic material when forming the inorganic alignment layer 42 on the side of facing substrate 20. The angle $\theta_3$ made between this oblique evaporation direction $S_C$ and the facing substrate 20 is 5 degrees to 10 degrees as shown in FIG. 8.

By doing this, the facing substrate 20 with the facing electrode 21 on which the inorganic alignment layer 42 is provided can be obtained as shown in FIG. 15.

Here, the oblique evaporation direction $S_C$ is different by 180 degrees from the oblique evaporation direction $S_A$ when forming the first inorganic alignment layer 36a.

Consequently, an empty panel is formed by disposing the TFT array substrate 10 and the facing substrate 20 of which each layer is formed in above manner in such a way that each oblique evaporation direction is opposite to the other, in other words, the direction of alignment of the TFT array substrate 10 and the facing substrate 20 is opposite to the alignment direction of the columnar structure which is aligned at a predetermined angle, and by bonding the substrates by the shielding material 52 so as to make the thickness of the cell to be 4 μm. The liquid crystal such as positive fluorine liquid crystal is enclosed in the panel; thus, the liquid crystal device of the present embodiment can be obtained.

In this embodiment, the second shading layer 23, the facing electrode 21, and the alignment layer 42 are provided on the facing substrate 10 in this order; thus, the advantage that high voltage is not necessary for driving the liquid crystal is obtainable. Instead of this disposition, the disposition in the order of the facing electrode 21, the second shading layer 23, and the alignment layer 42 is possible. In that case, the patterning of the second shading layer 23 and the alignment layer 42 can be performed in one operation; thus, advantages such as more simplified manufacturing process can be obtained.

According to the manufacturing method for a substrate of the liquid crystal device in the present embodiment, the first and the second oblique evaporation steps are provided, the oblique evaporation direction $S_A$ of the inorganic material of the first oblique evaporation step and oblique evaporation direction $S_B$ of the inorganic material of the second oblique evaporation step are different with regard to the azimuth angle direction $\phi$ along the inside plane direction of the substrate. Therefore, in the second oblique evaporation step, the inorganic oblique evaporation layer can be formed in the area on which the inorganic oblique evaporation layer could not be formed in the first oblique evaporation step. Although, in the first oblique evaporation step, the first inorganic oblique evaporation layer 36a is formed in the area 80b where the area 80a close to the gap section 80 is excluded, the area 80a close to the gap section 80 is in the shadow of the gap section 80; thus, the area where the first inorganic oblique evaporation layer 36a is not formed is generated. However, by changing the azimuth angle direction of the oblique evaporation direction $S_B$ of the inorganic material so as to differ from the azimuth angle direction of the oblique evaporation direction $S_A$ of the inorganic material in the evaporation of inorganic material, the second inorganic oblique evaporation layer 36b can be formed in the area 80a where the inorganic oblique evaporation layer could not be formed in the first oblique evaporation step due to the shadow made by the gap section 80. Also, in the second oblique evaporation step, the second inorganic oblique evaporation layer 36b can be also formed at least on the first inorganic oblique evaporation layer 36a which is on both sides of the gap section 80.

According to the manufacturing method for substrate of the liquid crystal device with such a construction, a suitable substrate for a liquid crystal device of the present embodiment can be manufactured.

Additionally, in the liquid crystal device and the manufacturing method for a substrate of the liquid crystal device of the above embodiment, the explanation was made for the case in which the present invention is applied to an active matrix type liquid crystal device using a three-terminal element typically represented by a TFT element, and to a manufacturing method for this substrate for a liquid crystal device. The present invention can also be applied to an active matrix type liquid crystal device using a two-terminal element typically represented by a TFD element, the manufacturing method for a substrate of this liquid crystal device, a passive matrix type liquid crystal device, and the manufacturing method for a substrate for this liquid crystal device. Also, the present invention can be applied not only to a transparent type liquid crystal device, but also to a reflex type liquid crystal device.

Additionally, in the manufacturing method for the liquid crystal device of the above embodiment, the explanation was made for the case in which the inorganic alignment layer 36 on the side TFT array substrate 10 is formed in the first and the second oblique evaporation steps, in other words, with a method in which the evaporation is performed twice while changing the azimuth angle direction. Even if the height of the gap section of the surface of the underlayer of the inorganic alignment layer 42 on the side of the facing substrate 20 is large, inorganic alignment layer 36 may be formed in the first and the second oblique evaporation steps, in other words, by a method in which the evaporation is performed twice while changing the azimuth angle direction. For example, inorganic alignment layer 36 is formed with the oblique evaporation step in which the facing substrate 20 on which the facing electrode 21 and the like are formed are fixed with a certain angle, evaporation of inorganic material such as silicon oxide is performed from a direction $S_C$ unidirectionally, the columnar structures aligned towards the substrate 20 with a predetermined angle is grown. Consequently, inorganic alignment layer 36 can be formed with the oblique evaporation step in which the oblique evaporation of inorganic material is performed from the direction $S_D$ in which the azimuth angle direction along the inside plane direction of the substrate 20 is different from the azimuth angle direction of the oblique evaporation direction $S_C$, more preferably from the direction at which the difference of the azimuth angle direction is almost 90 degrees, and the columnar structures aligned towards the substrate with a predetermined angle are grown. In that case, the evaporation angle $\theta_3$ of the oblique evaporation direction $S_C$ should preferably be 5 degrees to 10 degrees, and the evaporation angle $\theta_4$ of the oblique evaporation direction $S_D$ should preferably be 25 degrees to 30 degrees.

Also, in the present embodiment, an explanation was made for the case in which the present invention was applied to the case in which the inorganic alignment layer is formed on the underlayer which has a gap section and is formed on the TFT array substrate. However, the present invention can be applied to the case in which the wiring layers and the like are embedded in the substrate of the element side, and there is concave area (gap section) on the flat and smooth surface of the underlayer in the inorganic alignment layer due to a contact hole or the like.

Overall Construction of Liquid Crystal Device

The overall construction of the liquid crystal device of the third embodiment is the same as the overall construction of the liquid crystal device of the first and the second embodiments, and explanations thereof are omitted for the duplicated parts.

The scanning line driving circuit 104 may be only one side unless the delay of the scanning signal supplied to the scanning line 3a is a problem.

Also, the data line driving circuit 101 may be disposed on both sides of the picture display area along the member of the picture display area. For example, data lines 6a in an odd-numbered may supply the picture signal from the data line driving circuit disposed along one member of the picture display area, and data lines 6a in the even-numbered row may supply the picture signal from the data line driving circuit disposed along the opposite member of the picture display area. By driving the data lines 6a in a comblike manner, the area occupied by the data line driving circuit can be enlarged; thus, a more complicated circuit becomes possible.

In addition, a pre-charge circuit may be provided under the third shading layer 53 as a corner bead so as not to be visible.

Additionally, a micro-lens may be formed so as to correspond to each pixel on the facing substrate 20. By doing this way, the efficiency of condensing the light of the incident light is improved; thus, a bright liquid crystal device can be realized. Furthermore, a dichroic filter for generating RGB colors may be formed on the facing substrate 20 by piling the interference layers of which refractive indexes are different and by using the interference of light. According to the dichroic-filter-built-in facing substrate, a brighter liquid crystal device can be realized.

Also, in each embodiment, although the switching element provided in each pixel is explained as positive staggered type polysilicon, or coplanar type polysilicon, the present embodiment is effective in other types of TFTs such as an inverted-stagger type TFT and amorphous silicon TFT.

Electronic Device

The construction of an electronic device of the third embodiment is the same as the construction of the electronic devices of the first and the second embodiments.

When a liquid crystal device is used for a light valve in the projection type display device, the intensity of the incident light is high as compared to the case in which the liquid crystal device is used for a direct-view type liquid crystal device. Therefore, if the alignment layer is made of an organic alignment layer such as polyimide, deterioration of the alignment layer occurs noticeably and easily. On the other hand, in the electronic device of the present embodiment, the alignment layer is made of an inorganic oblique evaporation layer such as of silicon oxide or the like, liquid crystal device 962R, 962G, and 962B in which occurrence of inferior display due to the deteriorated alignment layer is reduced are provided. Therefore, the projection type display device in which display quality is high can be realized even if the device is used for long periods. Also, in the liquid crystal devices 962R, 962G, and 962B of each embodiment, when forming the inorganic alignment layer 36 on the underlayer having the gap section 80 as explained above, the area on which the evaporation of inorganic material is easy (the area 80b where the area 80a close to the gap section 80 is excluded) and the area 80b close to the gap section 80 where the occurrence of defective areas of evaporation of inorganic material is easy are formed separately. Therefore, the above first inorganic oblique evaporation layer 36a is formed in the area 80b where the area close to the gap section 80 is excluded, and the second inorganic oblique evaporation layer 36b is formed in the area 80a close to the gap section 80. Thus, there is no area with defective evaporation such as uneven evaporation of inorganic material or such as where no evaporation occurred in the area 80a close to the gap section 80.

EXPERIMENTAL EXAMPLE

The inventors of the liquid crystal device of the present invention performed an experiments to demonstrate the relationship between the d/P as a ratio of cell gap d of the liquid crystal device and P as a helical pitch of the liquid crystal layer, and the effectiveness of restricting the defect alignment The result of the experiments are explained as follows.

Experimental Example 1

The liquid crystal device of above first embodiment which is provided with the alignment layer made of two layers of inorganic oblique evaporation layer was produced. The pre-tilt angle θ was varied to various values by controlling the evaporation conditions while the cell gap d was made to be 3 μm, and the twist angle φ of the liquid crystal layer was 90 degrees. The value of the helical pitch P of the liquid crystal was changed to 30, 15, 10, 7.5 (μm) by adjusting the amount of chiral complex which is added to the raw material for liquid crystal. The existence of defective alignment was detected on the display of an actual projection type display device by visual observation under condition that the pre-tilt angle θ is 8 degrees. The results are shown in TABLE 1.

TABLE 1

| P (μm) | d/P(-) | Display Condition |
|---|---|---|
| 30 | 0.1 | A |
| 15 | 0.2 | O |
| 10 | 0.3 | O |
| 7.5 | 0.4 | B |

In TABLE 1, "A" in "Display Condition" indicates the case in which the area in which the twist angle is 90 degrees or less is generated in the pixel. "O" indicates proper alignment. "B" indicates the case in which the area in which over-twist angle such as 270 degrees occurred is generated in the pixel.

Regarding the above experiment, the above experimental results shown are typical examples under conditions in which the pre-tilt angle is set to be 8 degrees. However, almost the same results as in the case of TABLE 1 were obtained under conditions in which the alignment layer is made of two layers of inorganic oblique evaporation layer, and the pre-tilt angle differed accordingly. That is, from TABLE 1, it is understood that defective alignment can be prevented under conditions in which the average pre-tilt angle θ is set to be 5 degrees to 20 degrees, d/P as a ratio of cell gap d of the liquid crystal device and the helical pitch P of the liquid crystal layer is set to be 0.15<d/P<0.35, or more preferably to be 0.2<d/P<0.3. Although the above results are effective under conditions in which the twist angle φ is 90 degrees, it was also found that this tendency of d/P as a ratio of cell gap d and the helical pitch P is in proportion with the twist angle φ of the liquid crystal device. Thus, by more generalized formula using the twist angle φ of the liquid crystal layer, it was found that the defective alignment can be restricted if a relationship such as (0.3/360)φ<d/P<(1.4/360) is satisfied.

Experimental Example 2

The liquid crystal device of the second embodiment in which the alignment layer made of a single layer of inorganic oblique evaporation layer was produced. The pre-tilt angle θ was varied to various values by controlling the evaporation conditions while the cell gap d is made to be 3 μm, and the twist angle φ of the liquid crystal layer is 90 degrees. The value of the helical pitch P of the liquid crystal was changed to 20, 12, 8.6, 6.7 (μm) by adjusting the amount of chiral complex which is added to the raw material for liquid crystal. The existence of defective alignment was detected on the display of actual projection type display device by visual observation under conditions in which the pre-tilt angle θ was 27 degrees. The results are shown in TABLE 2.

TABLE 2

| P (μm) | d/P(-) | Display Condition |
|---|---|---|
| 20 | 0.15 | C |
| 12 | 0.25 | O |
| 8.6 | 0.35 | O |
| 6.7 | 0.45 | B |

In TABLE 2, "A" in "Display Condition" indicates the case in which the area in which the twist angle is 90 degrees or less is generated in the pixel. "O" indicates a proper alignment. "C" indicates the occurrence of a reverse twist domain "B" indicates the case in which the area in which over-twist angle such as 270 degrees occurred is generated in the pixel.

Regarding the above experiment, the above experimental results are shown as typical examples under condition in which the pre-tilt angle is set to be 27 degrees. However, nearly the same result as in the case of TABLE 2 resulted under conditions in which the alignment layer is made of a single layer of inorganic oblique evaporation layer, and the pre-tilt angle differs accordingly. That is, from TABLE 2, it is understood that defective alignment can be prevented under conditions in which the average pre-tilt angle θ is set to be 20 degrees or larger, d/P as a ratio of cell gap d of the liquid crystal device and the helical pitch P of the liquid crystal layer is set to be 0.20<d/P<0.40, or more preferably to be 0.25<d/P<0.35. Also, it was found that this tendency of d/P as a ratio of cell gap d and the helical pitch P is in proportion with the twist angle φ of the liquid crystal device. Thus, by a more generalized formula using the twist angle φ of the liquid crystal layer, it was found that the defect alignment can be restricted if a relationship such as (0.8/360)φ<d/P<(1.6/360) is satisfied.

Experimental Example 3

Also, the inventors of the liquid crystal device of the present invention performed an experiment for proving the effect of the liquid crystal device in the present invention. The result of the experiments are explained as follows.

When the first inorganic oblique evaporation layer is formed by performing the oblique evaporation of silicon oxide (SiO) from the direction $S_A$ unidirectionally so as to make the thickness of the layer to be 10 nm on the surface of the TFT array substrate having the gap section on its surface and the TFT element and the pixel electrodes or the like are formed as shown in the third embodiment, the evaporation angle $\theta_1$ (the angle made by the evaporation direction and the substrate) of SiO was changed within the range of 2.5 degrees to 15 degrees. Next, when the second inorganic oblique evaporation layer is formed by performing the oblique evaporation of Silicon oxide (SiO) from the direction $S_B$ in which the azimuth angle direction φ is different from the azimuth angle direction of the above oblique evaporation direction $S_A$ so as to make the thickness of the layer to be 20 nm, the evaporation angle $\theta_2$ (the angle made by the evaporation direction and the substrate) of SiO was changed within the range of 25 degrees to 30 degrees. The oblique evaporation direction $S_A$ is orthogonal to the scanning line 3a and the capacity line 3b in FIG. 2, and the oblique evaporation direction $S_A$ was made to be a direction from the bottom side of the plan view of FIG. 2. Also, the oblique evaporation direction $S_B$ is along the scanning line 3a and the capacity line 3b in FIG. 2, and the oblique evaporation direction $S_B$ was made to be a direction from the right-hand side of the plan view of FIG. 2. Here, the azimuth angle direction of the oblique evaporation direction $S_B$ and the azimuth angle direction of the oblique evaporation direction $S_A$ are different from each other by 90 degrees.

On the other hand, the inorganic oblique evaporation layer was formed by performing the oblique evaporation of silicon oxide (SiO) on the surface of the facing substrate on which the black matrix (shading layer) and the facing electrode is formed as shown in the third embodiment so as to make the thickness of the layer to be 10 nm from one direction $S_C$ unidirectionally. Here, the evaporation angle (angle made by the evaporation direction the substrate) $\theta_3$ of the oblique evaporation direction $S_C$ was set to be 5 degrees.

Next, various types of liquid crystal devices were produced by forming a seal section by seal-printing on the surface which becomes the side of the liquid crystal layer of one substrate on which the above inorganic oblique evaporation layer is formed while letting the inlet for pouring the liquid crystal be unsealed, by producing the liquid crystal panel by bonding the TFT array substrate and the facing substrate, by pouring the fluorine positive liquid crystal into the panel from the inlet, and by closing the inlet with the sealing member.

The alignment conditions of the liquid crystals of various liquid crystal devices produced in this way were examined. The results are shown in TABLE 3.

TABLE 3

| Angle of first oblique evaporation (degrees) | 2.5 | 5 | 10 | 15 |
|---|---|---|---|---|
| Angle of second oblique evaporation (degrees) | | | | |
| 20 | X | X | X | X |
| 25 | X | ○ | ○ | X |
| 30 | X | ○ | ○ | X |
| 35 | X | X | X | X |

In TABLE 3, ○ indicates the alignment condition in which there is no defective evaporation area in which the evaporation of silicon oxide is not performed and the alignment condition in which there is no inferior alignment of liquid crystal molecules due to abnormality of the alignment layer. Also, × indicates the alignment condition in which there is defective alignment areas in which the evaporation of silicon oxide is not performed, and the alignment condition in which there is inferior alignment of liquid crystal molecules due to the abnormalities in the alignment layer. As can be understood from the result of TABLE 3, when the evaporation angle (first evaporation angle) is set to be 2.5 degrees or to be 15 degrees(an angle which is not in the range of 5 degrees to 10 degrees) when forming the first inorganic oblique evaporation layer, the alignment condition becomes disordered, even if the evaporation angle (second evaporation angle) is at any angle. When the evaporation angle (second evaporation angle) is set to be 25 degrees or to be 30 degrees(angle which is not in the range of 25 degrees to 30 degrees) when forming the first inorganic oblique evaporation layer, the alignment condition becomes disordered, even if the first inorganic oblique evaporation angle (first evaporation angle) is any angle.

In contrast, in the liquid crystal device in which the evaporation angle (first evaporation angle) is set to be 5 degrees to 10 degrees when forming the first inorganic oblique evaporation layer, and at the same time, the evaporation angle (second evaporation angle) is set to be 25 degrees to 30 degrees when forming the second inorganic oblique evaporation layer, the alignment condition becomes in order; thus, it can be understood that the alignment condition is good.

Experimental Example 4

When the first inorganic oblique evaporation layer is formed by performing the oblique evaporation of silicon oxide (SiO) from the direction $S_A$ unidirectionally, the thickness of the layer was changed to be 2.5 nm to 20 nm on the surface of the TFT array substrate having the gap section on its surface and the TFT element and the pixel electrodes or the like are formed as shown in the third embodiment. Next, when the second inorganic oblique evaporation layer is formed by performing the oblique evaporation of silicon oxide (SiO) from the direction $S_B$ of which azimuth angle direction ϕ is different from the azimuth angle direction of the above oblique evaporation direction $S_A$, the thickness of the layer was changed to be 8 nm to 45 nm. Here, the oblique evaporation direction $S_A$ is orthogonal to the scanning line 3a and the capacity line 3b in FIG. 2, and the oblique evaporation direction $S_A$ was made to be a direction from the bottom side of the plan view of FIG. 2. The evaporation angle (angle made by the evaporation direction and the substrate) $\theta_1$ of SiO was set to be 25 degrees. Also, the oblique evaporation direction $S_B$ is along the scanning line 3a and the capacity line 3b in FIG. 2, and the oblique evaporation direction $S_B$ was made to be a direction from the right-hand side of the plan view of FIG. 2. Also, the evaporation angle (angle made by the evaporation direction and the substrate) $\theta_2$ of SiO was set to be 25 degrees. Here, the azimuth angle direction of the oblique evaporation direction $S_B$ and the azimuth angle direction of the oblique evaporation direction $S_A$ differ from each other by 90 degrees.

On the other hand, an inorganic oblique evaporation layer was formed by performing the oblique evaporation of silicon oxide (SiO) on the surface of the facing substrate on which the black matrix (shading layer) and the facing electrode is formed as shown in the third embodiment so as to make the thickness of the layer to be 10 nm from one direction $S_C$ unidirectionally. Here, the evaporation angle (angle made by the evaporation direction the substrate) $\theta_3$ of the oblique evaporation direction $S_C$ was set to be 5 degrees.

Next, various types of liquid crystal devices were produced by forming the seal section by seal-printing on the surface which becomes the side of the liquid crystal layer of one substrate on which the above inorganic oblique evaporation layer is formed while letting the inlet for pouring the liquid crystal be unsealed, by producing the liquid crystal panel by bonding the TFT array substrate and the facing substrate, by pouring a fluorine positive liquid crystal into the panel from the inlet, and by closing the inlet with the sealing member.

The alignment conditions of the liquid crystals of various liquid crystal devices produced in this way were examined. The results are shown in TABLE 4.

TABLE 4

| Thickness of first oblique evaporation layer (nm) | Thickness of first oblique evaporation layer (nm) | | | | |
|---|---|---|---|---|---|
| | 2.5 | 5 | 10 | 16 | 15 |
| 8 | X | L | L | L | L |
| 10 | S | ○ | ○ | ○ | L |
| 40 | S | ○ | ○ | ○ | L |
| 45 | S | S | S | S | S |

In TABLE 4, "L" indicates that the average pre-tilt angle of the liquid crystal is less than 3 degrees as a defect because of low pre-tilt. "S" indicates average pre-tilt angle of the liquid crystal is larger than 20 degrees as a defect because of high pre-tilt. ○ indicates the alignment condition in which there is no disordered alignment of the liquid crystal, and the average pre-tilt angle is 5 degrees to 15 degrees as a good alignment. × indicates the alignment condition in which there is disordered alignment of the liquid crystal molecules.

As can be understood from the results of TABLE 4, when the thickness of the layer is set to be 2.5 nm or to be 20 nm (not in the range of 5 nm to 16 nm), when forming the first inorganic oblique evaporation layer, the pre-tilt of the liquid crystal molecules is low or high, or the alignment direction of the liquid crystal molecules becomes disordered, and the alignment condition is inferior, even if the thickness of the second inorganic oblique evaporation layer is of any value. When the thickness of the layer is set to be 8 nm or to be 45 nm (not in the range of 10 nm to 40 nm), when forming the second inorganic oblique evaporation layer, the pre-tilt of the liquid crystal molecule is low or high, or the alignment direction of the liquid crystal molecules become disordered, and the alignment condition is inferior, even if the thickness of the first inorganic oblique evaporation layer is of any value.

In contrast, in the liquid crystal device in which the evaporation angle (first evaporation angle) is set to be 5 degrees to 16 degrees when forming the first inorganic oblique evaporation layer, and at the same time, the evaporation angle (second evaporation angle) is set to be 10 degrees to 40 degrees when forming the second inorganic oblique evaporation layer, the alignment condition becomes ordered; thus, it can be understood that the alignment condition is good because the average pre-tilt angle is in the range of 5 degrees to 10 degrees.

As explained above in detail, according to the liquid crystal device of the present invention, by optimizing the d/P as a ratio of the cell gap d of the liquid crystal device and the helical pitch P of the liquid crystal layer, the disclination which occurred in the conventional liquid crystal device using inorganic alignment layer can be prevented effectively; thus a liquid crystal device with no defective display such as light leakage because of disclination and with good contrast can be realized. Also, the liquid crystal device which is excellent with regard to light resistance and heat resistance, and which is favorable to be used as a liquid crystal light valve can be realized as compared to a liquid crystal device having an inorganic alignment layer made of an organic layer such as of polyimide.

Also, according to the liquid crystal device of the present invention, an inorganic alignment layer formed on the underlayer having the gap section is made of the first inorganic oblique evaporation layer having columnar structures of slanted inorganic material and a second inorganic oblique evaporation layer of which the azimuth angle direction of the slanting direction of the columnar structures of the inorganic material is different from the azimuth angle direction of the slanting direction of the columnar structures of the first inorganic oblique evaporation layer. Furthermore, because above second inorganic oblique evaporation layer is formed in the area close to the above gap section, the occurrence of defective areas of evaporation where there is uneven evaporation of inorganic material, and the area where evaporation is not performed in the area close to above gap section can be reduced. Accordingly, even if the pixel pitch is as fine as 20 $\mu$m or less, there is no abnormality in the inorganic alignment layer formed on the underlayer having the gap section on the surface, the defective alignment of the liquid crystals due to the abnormality of alignment layer can be prevented, and the occurrence of inferior display such as low contrast can be prevented. Such effect can also be obtained even if the pixel pitch becomes as fine as 15 $\mu$m or less.

Additionally, by adopting the present liquid crystal device, a projection type display device with high display quality can be realized.

What is claimed is:

1. A liquid crystal device comprising:
   a liquid crystal layer disposed between a pair of substrates facing each other; and
   inorganic alignment layers disposed on a surface of a liquid crystal layer side of the pair of the substrates;
   wherein the range of average pre-tilt angle θ of liquid crystal molecules 50a in the liquid crystal layer is 5 degrees≦θ≦20 degrees; and
   twist angle φ of the liquid crystal molecules in the liquid crystal layer, cell gap d, and helical pitch P of the liquid crystal molecules in the liquid crystal layer satisfy the relationship of $(0.6/360)\phi<d/P<(1.4/360)\phi$.

2. A liquid crystal device according to claim 1, wherein:
   the inorganic alignment layers are made of two layers of oblique evaporation layers which have columnar structures of an inorganic material slanting in different directions;
   azimuth angle directions of the slanting direction of the columnar structures of the inorganic material forming both oblique evaporation layers are different inside the plane of the substrate.

3. A liquid crystal device comprising:
   a liquid crystal layer disposed between a pair of substrates facing each other;
   inorganic alignment layers disposed on a surface of a liquid crystal layer side of the pair of the substrates;
   wherein the range of average pre-tilt angle θ of liquid crystal molecules 50a of the liquid crystal layer is 0>20 degrees; and
   twist angle φ of the liquid crystal molecules of the liquid crystal layer, cell gap d, and helical pitch P of the liquid crystal molecules of the liquid crystal layer satisfy the relationship of $(0.8/360)\phi<d/P<(1.6/360)\phi$.

4. A liquid crystal device according to claim 3, wherein the alignment layers are made of oblique evaporation layer which are columnar structure of inorganic material slanting in different directions.

5. A liquid crystal device according to claim 1, wherein the alignment layers are oblique evaporation layers made of silicon oxide.

6. A projection display device, provided with a liquid crystal device according to claim 1, comprising:
   a light source for emitting light;
   the liquid crystal device which modulates the light emitted from the light source; and
   a magnifying projection optical system which magnifies the light modulated by the liquid crystal device and projects the light on a projection plane.

7. A liquid crystal device comprising:
   a liquid crystal layer disposed between a pair of substrates facing each other;
   an underlayer having a gap section;
   inorganic alignment layers disposed on a surface of a liquid crystal layer side of the pair of the substrates, and formed above the underlayer comprising a first inorganic oblique evaporation layer and a second inorganic oblique evaporation layer formed in an area close to the gap section adjacent the first inorganic oblique evaporation layer;

wherein the first and the second inorganic oblique evaporation layers are made of slant columnar structure of inorganic material; and wherein azimuth angle directions of slanting direction of columnar structure of inorganic material constructing both the first and the second oblique evaporation layers are different inside the plane of the substrate.

8. A liquid crystal device according to claim 7, wherein azimuth angles of slanting directions of columnar structures of an inorganic material constituting both the first and the second oblique evaporation layers differ by nearly 90 degrees.

9. A liquid crystal device according to claim 7, wherein the thickness of the first inorganic oblique evaporation layer is in the range of 5 nm to 16 nm, and the thickness of the second organic oblique evaporation layer is in the range of 10 nm to 40 nm.

10. A liquid crystal device according to claim 7, wherein pre-tilt angle $\theta_p$ of liquid crystal molecules of the liquid crystal layer is in the range of 5 to 15 degrees.

11. A liquid crystal device according to claim 7, wherein the inorganic alignment layers are oblique evaporation layers made of silicon oxide.

12. A projection display device, provided with a liquid crystal device according to claim 7, comprising:

a light source for emitting light;

the liquid crystal device which modulates the light emitted from the light source; and a magnifying projection optical system which magnifies the light modulated by the liquid crystal device and projects the light on a projection plane.

13. A liquid crystal device comprising:

a liquid crystal layer disposed between a pair of substrates facing each other;

a plurality of pixel electrodes disposed in a matrix, a plurality of switching devices which drive the plurality of the pixel electrode, a plurality of data lines and a plurality of scanning lines connected respectively to the plurality of the switching devices are provided on either one of the pair of substrates;

facing electrodes provided on the other substrate;

inorganic alignment layers provided respectively on the surface of the liquid crystal side of the pair of substrates;

an underlayer of at least either one of an inorganic alignment layer on the side of which the switching device is provided has a gap section on its surface;

the inorganic alignment layers formed on the underlayer having the gap section, comprising a first inorganic oblique evaporation layer and a second inorganic oblique evaporation layer formed in an area close to the gap section and on the first inorganic oblique evaporation layer;

the first and the second inorganic oblique evaporation layers comprise slanted columnar structures of an inorganic material;

azimuth angle directions of slanting directions of columnar structures of inorganic materials constructing both the first and the second oblique evaporation layers are different inside the plane of the substrate.

* * * * *